US012605898B1

(12) United States Patent
Wang et al.

(10) Patent No.: US 12,605,898 B1
(45) Date of Patent: Apr. 21, 2026

(54) DETACHABLE MATERIAL SPOOL

(71) Applicant: ORANGE AI LIMITED, Hong Kong (CN)

(72) Inventors: Zhen Wang, Hong Kong (CN); Weiwen Luo, Hong Kong (CN); Yihan Ni, Hong Kong (CN)

(73) Assignee: ORANGE AI LIMITED, Hong Kong (CN)

( * ) Notice: Subject to any disclaimer, the term of this patent is extended or adjusted under 35 U.S.C. 154(b) by 0 days.

(21) Appl. No.: 19/300,751

(22) Filed: Aug. 15, 2025

(30) Foreign Application Priority Data

Jul. 15, 2025 (CN) .......................... 202521480831.3

(51) Int. Cl.
| | | |
|---|---|---|
| *B65H 75/28* | (2006.01) | |
| *B29C 64/321* | (2017.01) | |
| *B33Y 40/00* | (2020.01) | |

(52) U.S. Cl.
CPC ............ *B29C 64/321* (2017.08); *B33Y 40/00* (2014.12)

(58) Field of Classification Search
CPC .... B65H 75/14; B65H 75/28; B65H 75/2227; B65H 75/2272; B65H 75/2281; B29C 64/321; B33Y 40/00
See application file for complete search history.

(56) References Cited

U.S. PATENT DOCUMENTS

| | | | | |
|---|---|---|---|---|
| 4,726,534 A | * | 2/1988 | Chenoweth | ........ B65H 75/2227 242/906 |
| 4,903,913 A | * | 2/1990 | McCaffrey | ......... B65H 75/2245 242/610.6 |
| 7,954,748 B2 | * | 6/2011 | Weissbrod | ............. B65H 75/14 242/580 |
| 10,059,562 B2 | * | 8/2018 | Meyrahn | ............ B65H 75/2281 |
| 11,697,569 B2 | * | 7/2023 | Fratianni | ............ B65H 75/2272 242/608.6 |
| 2019/0218056 A1 | * | 7/2019 | Chen | ...................... B33Y 40/00 |
| 2022/0324171 A1 | * | 10/2022 | Neumann | .............. B65H 75/28 |
| 2024/0400343 A1 | * | 12/2024 | Nichols | .................. B65H 75/14 |
| 2024/0400344 A1 | * | 12/2024 | Nichols | .................. B65H 75/14 |
| 2024/0400345 A1 | * | 12/2024 | Brown | .............. B65H 75/2218 |

FOREIGN PATENT DOCUMENTS

CN          222522044 U      2/2025

* cited by examiner

*Primary Examiner* — Sang K Kim

(57) ABSTRACT

A detachable material spool includes a first spool body, a second spool body, a mounting cylinder, and a limiting assembly. The mounting cylinder is arranged on the first spool body and configured to mount a consumable roll. The limiting assembly is arranged on the second spool body. The second spool body is detachably connected to the mounting cylinder through the limiting assembly. During disassembly of the second spool body from the mounting cylinder, the second spool body moves only along an axial direction of the mounting cylinder, or the second spool body moves only along an oblique path which forms a fixed angle with respect to the axial direction of the mounting cylinder, for enabling the second spool body to be detached from an end face of the consumable roll.

20 Claims, 19 Drawing Sheets

DETACHABLE MATERIAL SPOOL

CROSS REFERENCE TO RELATED APPLICATIONS

This application claims priority to the Chinese patent application No. 202521480831.3, filed on Jul. 15, 2025, the disclosure of which is incorporated by reference herein in its entirety.

FIELD OF THE DISCLOSURE

The present disclosure relates to the field of 3D printing technology, and particularly to a detachable material spool.

BACKGROUND

For 3D printers in some related art, a material spool is used to carry a consumable roll. The material spool is usually a one-piece structure, including a spool body and a mounting cylinder to secure the consumable roll. Once consumables are used up, the material spool is discarded, leading to unnecessary waste due to a non-reusable nature.

SUMMARY

The present disclosure provides a detachable material spool.

The detachable material spool includes a first spool body, a second spool body, a mounting cylinder, and a limiting assembly. The mounting cylinder is arranged on the first spool body and configured to mount a consumable roll. The limiting assembly is arranged on the second spool body. The second spool body is detachably connected to the mounting cylinder through the limiting assembly. During disassembly of the second spool body from the mounting cylinder, the second spool body moves only along an axial direction of the mounting cylinder, or the second spool body moves only along an oblique path which forms a fixed angle with respect to the axial direction of the mounting cylinder, for enabling the second spool body to be detached from an end face of the consumable roll.

BRIEF DESCRIPTION OF THE DRAWINGS

Illustrative embodiments of the present disclosure are described in detail below with reference to the attached drawing figures.

REFERENCE NUMERALS IN THE DRAWINGS

Figure 1:
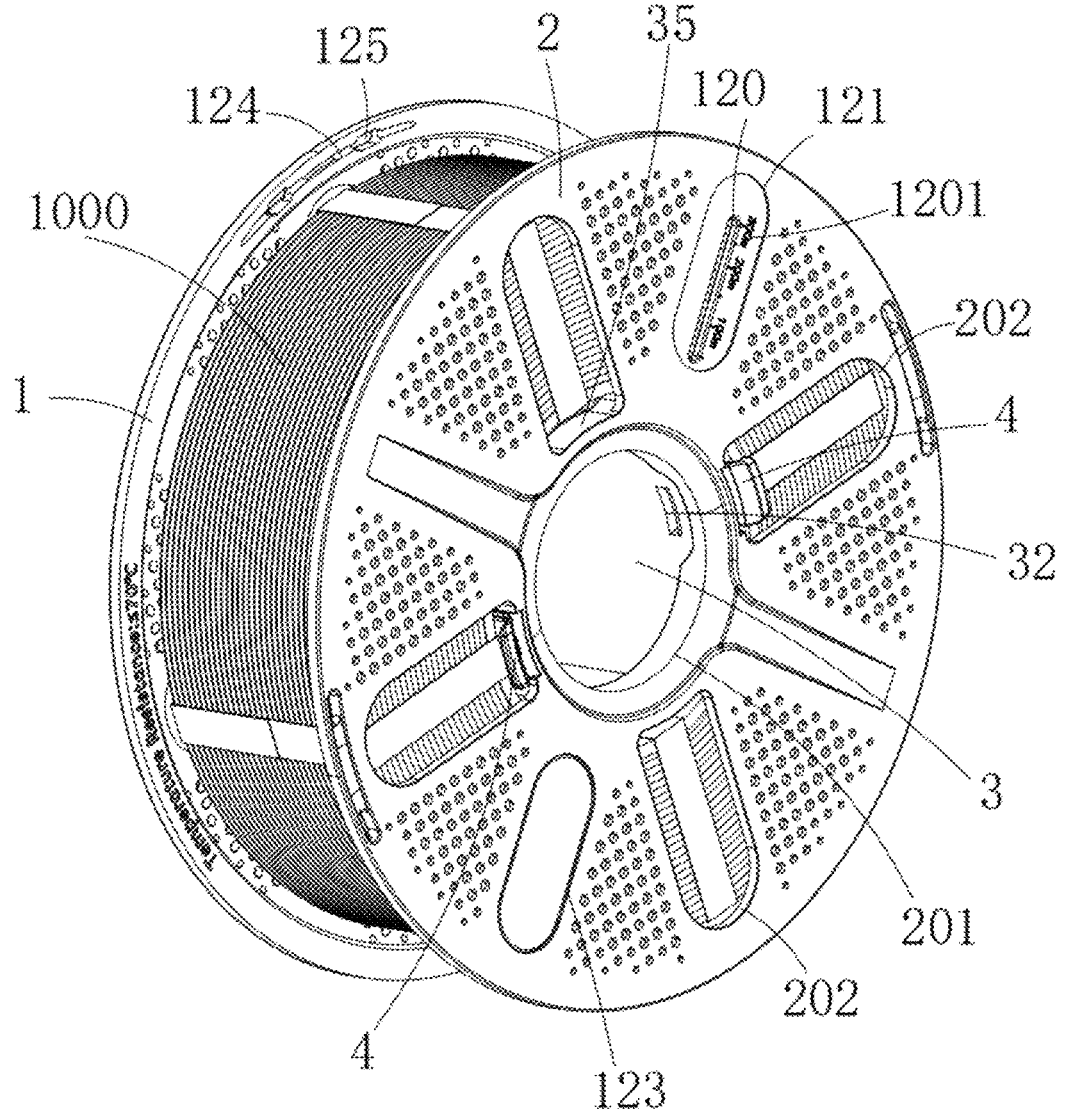
FIG. 1 is a schematic view of an overall structure of a detachable material spool according to an embodiment of the disclosure.

1—first spool body; 101—first mounting hole; 102—first bundling hole;

2—second spool body; 201—second mounting hole; 202—second bundling hole;

21—mounting opening; 211—abutting edge;

3—mounting cylinder; 301—circumferential direction of the mounting cylinder; 302—axial direction of the mounting cylinder; 303—radial direction of the mounting cylinder; 31—insertion slot; 32—locking opening; 34—accommodating slot; 35—through recess; 351—bottom face; 36—bolt hole;

4—limiting assembly; 41—docking member; 411—mounting cavity; 42—snap-fitting member; 43—elastic member; 44—hook; 421—driving portion; 4211—first inclined sliding boss; 422—snapping portion; 4221—second inclined sliding boss; 423—rotating portion; 4231—rotating shaft of the rotating portion; 424—sliding portion; 425—elastic connecting portion; 4251—first end of the elastic connecting portion; 4252—second end of the elastic connecting portion; 426—guiding member; 4261—guiding face; 427—locking bolt;

120—transparent window; 121—scale groove; 1201—length scale mark; 1202—weight scale sticker; 122—rib; 123—color card mounting slot; 124—wire clamping groove; 125—wire clamping hole;

1000—consumable roll; 1001—inner cylinder; 1002—consumable filament;

2000—bundling tool.

DETAILED DESCRIPTION

The following describes some non-limiting exemplary embodiments of the disclosure with reference to the accompanying drawings. The described embodiments are merely a part rather than all of the embodiments of the disclosure. All other embodiments obtained by a person of ordinary skill in the art based on the embodiments of the disclosure shall fall within the scope of the disclosure.

Unless otherwise defined, all technical and scientific terms used herein have the same meaning as commonly understood by one of ordinary skill in the art to which this invention belongs; the terminology used in the description of the application herein is for the purpose of describing particular embodiments only and is not intended to be limiting of the invention; the terms "comprising" and "having" and any variations thereof in the description and claims and the above description of the accompanying drawings are intended to cover non-exclusive inclusions. The terms "first, " "second," etc. in the description and claims or the above accompanying drawings are used to distinguish different objects, not to describe a specific order.

References herein to "embodiment" mean that a particular feature, structure, or characteristic described in connection with the embodiment may be included in at least one embodiment of the invention. The appearance of the phrase in various places in the specification does not necessarily all refer to the same embodiment, nor are they independent or alternative embodiments mutually exclusive of other embodiments. Those skilled in the art will explicitly and implicitly understand that the embodiments described herein may be combined with other embodiments.

In order to enable those skilled in the art to better understand the solutions of the present disclosure, the technical solutions in the embodiments of the present disclosure will be described clearly and completely below with reference to the accompanying drawings.

Referring to FIGS. 1 to 19, the present disclosure provides a detachable material spool. The detachable material spool may include a first spool body 1, a second spool body 2, a mounting cylinder 3, and a limiting assembly 4. The first spool body 1 and the second spool body 2 may be parallel to each other. The first spool body 1 may define a first mounting hole 101, and the second spool body 2 may define a second mounting hole 201. The mounting cylinder 3 may be fixed on the first spool body 1. The limiting assembly 4 may enable the mounting cylinder 3 to be detachably connected with the second spool body 2. When the mounting cylinder 3 and the second spool body 2 are connected with each other, the mounting cylinder 3 may be connected with the first spool body 1 and the second spool body 2 through the first mounting hole 101 and the second mounting hole 201. The first mounting hole 101 and the second mounting hole 201 may be used for corresponding mounting portions in a 3D printer to pass through. A consumable roll 1000 can be sleeved on an exterior of the mounting cylinder 3, and thus each of the mounting cylinder 3 and the consumable roll 1000 may be located between the first spool body 1 and the second spool body 2. The consumable roll 1000 may include an inner cylinder 1001 and a consumable filament 1002. The consumable filament 1002 may be wound on the inner cylinder 1001. The inner cylinder 1001 may be a hard paper tube or a plastic tube.

In one embodiment, the first spool body 1 may define at least one first bundling hole 102, and the second spool body 2 may define at least one second bundling hole 202. The first bundling hole 102 and the second bundling hole 202 may be formed positionally corresponding to each other. Each of a length of the first bundling hole 102 and a length of the second bundling hole 202 may be greater than a thickness of the consumable roll 1000. The thickness of the consumable roll 1000 refers to a thickness of the consumable roll 1000 in a radial direction 303 of the mounting cylinder 3. A bundling tool 2000 such as an adhesive tape, a zip tie, or a hook-and-loop fastener can bundle the consumable roll 1000 by passing through the first bundling hole 102 and the second bundling hole 202.

In one embodiment, the limiting assembly 4 may be arranged on the second spool body 2. The second spool body 2 may be detachably connected to the mounting cylinder 3 through the limiting assembly 4. The limiting assembly 4 can be connected to the mounting cylinder 3 by means of a snap connection, embedded connection, bolt connection, or other manners. The entire disassembly of the second spool body 2 from the mounting cylinder 3 may include two operations involving a first unlocking operation between the limiting assembly 4 and the mounting cylinder 3, and a second separation operation between the second spool body 2 and the mounting cylinder 3. Furthermore, in a case where the limiting assembly 4 is connected with the mounting cylinder 3 via a snap-fitting or embedded manner, the user may only need to apply a linear force to unlock the limiting assembly 4, and the linear force may be applied along an axial direction 302 of the mounting cylinder 3, along the radial direction 303 of the mounting cylinder 3, or along an oblique path which forms a fixed angle to the axial direction 302.

During the unlocking operation between the limiting assembly 4 and the mounting cylinder 3 and the separation operation between the second spool body 2 and the mounting cylinder 3, the second spool body 2 may only undergo a translation along the axial direction 302 of the mounting cylinder 3, or the second spool body 2 may only undergo an oblique translation at a fixed angle to the axial direction 302 of the mounting cylinder 3, so that the second spool body 2 may be detached from an end face of the consumable roll 1000. In these two operations, the second spool body 2 and the bundling tool 2000 may not come into contact, thereby preventing an edge of the second spool body 2 for forming the second bundling hole 202 from abutting against the bundling tool 2000.

In other words, when the limiting assembly 4 is connected to the mounting cylinder 3, the second spool body 2 may be fixed to the mounting cylinder 3 in a circumferential direction 301 of the mounting cylinder 3. That is, the second spool body 2 and the mounting cylinder 3 may not rotate relative to each other.

When in use, first, the consumable roll 1000 as a whole may be sleeved on the mounting cylinder 3. Then, the second spool body 2 may be brought close to the mounting cylinder 3 until the limiting assembly 4 is fully connected to the mounting cylinder 3. At this point, the first spool body 1 and the second spool body 2 cooperatively clamp the consumable roll 1000. After that, an original tape on the consumable roll 1000 may be removed, and then the detachable material spool may be mounted to the 3D printer. Finally, the consumable filament 1002 may be docked with a feeding mechanism of the 3D printer. A distance between the first spool body 1 and the second spool body 2 may be approximately equal to a width of the consumable roll 1000, mainly to prevent the consumable filament 1002 on the consumable roll 1000 from becoming loose.

When the user needs to change a color of a consumable of the 3D printer, and the consumable roll 1000 on the detachable material spool has not been fully consumed, the bundling tool 2000 may be used to bundle the consumable roll 1000 on the detachable material spool first by passing through the first bundling hole 102 and the second bundling hole 202. Then, a connection between the limiting assembly 4 and the mounting cylinder 3 may be released, and the second spool body 2 may be pulled out along the axial direction 302 of the mounting cylinder 3. The bundled consumable roll 1000 may then be removed from the mounting cylinder 3. Afterwards, a new consumable roll 1000 can be mounted to the detachable material spool by repeating the aforementioned mounting operations. During this process, since the second spool body 2 does not come into contact with the bundling tool 2000, interference between the second spool body 2 and the bundling tool 2000 can be prevented, and damage to the bundling tool 2000 can also be avoided.

In summary, when disassembling the second spool body 2 of the detachable material spool, the detachable material spool may not need to be rotated. Instead, after the connection between the limiting assembly 4 and the mounting cylinder 3 is released, the second spool body 2 may move directly along the axial direction 302 of the mounting cylinder 3 to be separated from the mounting cylinder 3. During the disassembly process, there may be no need for relative rotation between the second spool body 2 and the mounting cylinder 3, which may prevent friction between the second spool body 2 and the consumable roll 1000, and may also avoid interference with a movement of the second spool body 2 by the bundling tool 2000, making it more convenient to use.

In some embodiments, the limiting assembly 4 may include a docking member 41 and a snap-fitting member 42 mounted on the docking member 41. The docking member 41 may be annularly arranged on a side of the second spool body 2 facing the first spool body 1, the docking member 41 may be coaxially docked with the mounting cylinder 3, and the snap-fitting member 42 may be engaged with the mounting cylinder 3 in a snap fit manner. Specifically, the mounting cylinder 3 may define an insertion slot 31 extending along the axial direction 302 of the mounting cylinder 3, and a shape of the insertion slot 31 may match the docking member 41, so that the docking member 41 may be at least partially inserted in the insertion slot 31.

Regarding a problem of preventing the second spool body 2 from rotating relative to the mounting cylinder 3, in some embodiments, when the docking member 41 is inserted in the insertion slot 31, a rotation of the docking member 41 around the circumferential direction 301 of the mounting cylinder 3 may be restricted. On this basis, the snap-fitting member 42 may then be engaged with the mounting cylinder 3 in a snap-fit manner, which may prevent the docking member 41 from separating from the insertion slot 31 along the axial direction 302 of the mounting cylinder 3. For example, the docking member 41 may be generally annular but a surface of the docking member 41 may be non-circular, and the insertion slot 31 may be non-circular corresponding to the docking member 41. In this way, when the docking member 41 is inserted in the insertion slot 31, the docking member 41 may not rotate relative to the mounting cylinder 3. As another example, the docking member 41 may be composed of a plurality of mutually spaced portions, and the insertion slot 31 may correspondingly include a plurality of mutually spaced sub-slots, with each of the portions being inserted in one of the sub-slots, which can also prevent the docking member 41 from rotating relative to the mounting cylinder 3.

It can be understood that in other embodiments, the insertion slot 31 can also be formed in the docking member 41, and the mounting cylinder 3 may be inserted in the insertion slot 31.

It can be understood that, regarding an issue of preventing the second spool body 2 from rotating relative to the mounting cylinder 3, in other embodiments, each of the docking member 41 and the insertion slot 31 may be a circular ring, and then a snap-fitting structure consisted of the snap-fitting member 42 and the mounting cylinder 3 may prevent the docking member 41 from rotating relative to the mounting cylinder 3.

Figure 6:
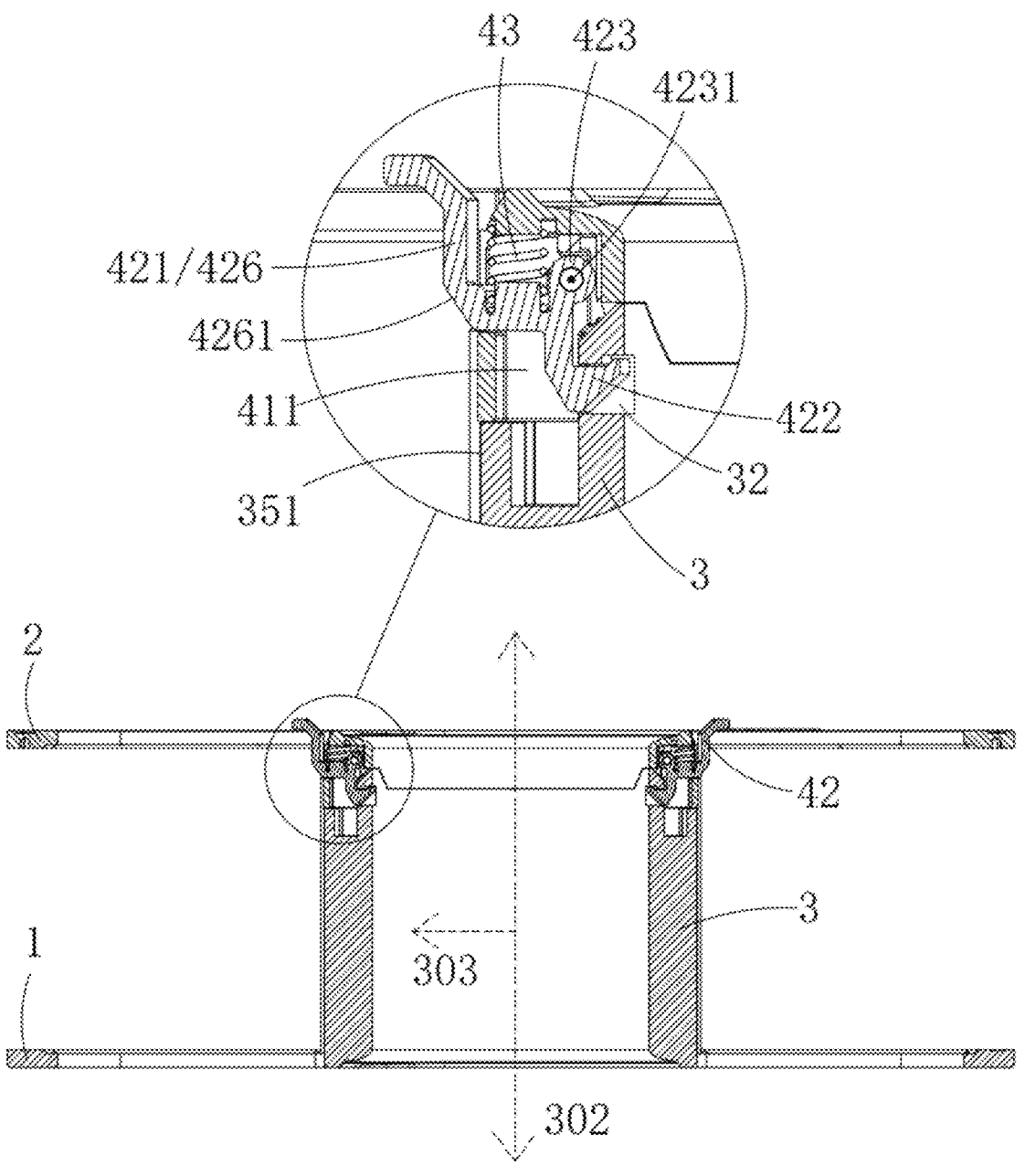
FIG. 6 is a cross-sectional view of the detachable material spool in Embodiment I, showing an elastic member as a compression spring.
Figure 7:
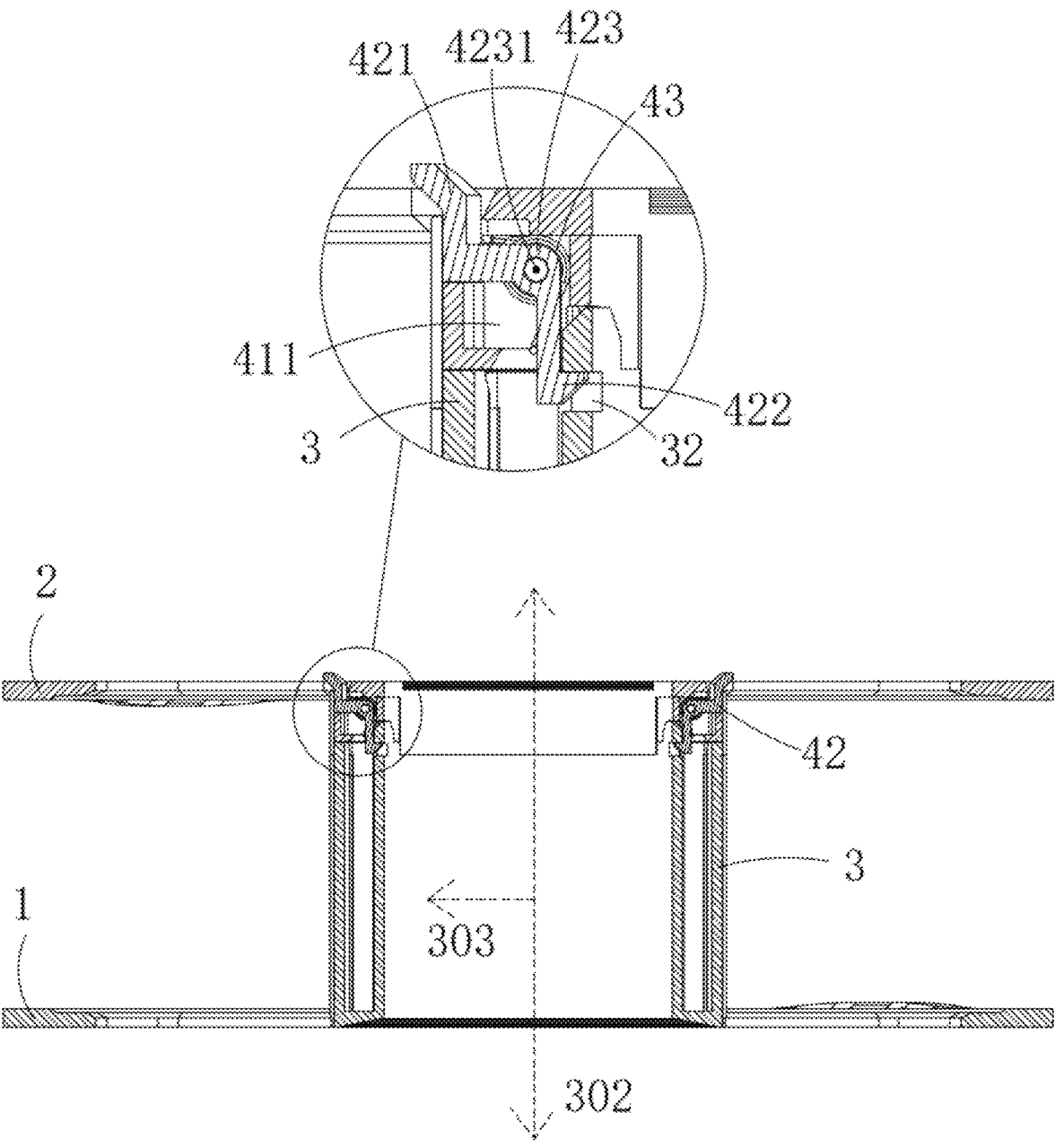
FIG. 7 is a cross-sectional view of the detachable material spool in Embodiment I, showing the elastic member as a torsion spring.

Regarding a detachable connection structure between the snap-fitting member 42 and the mounting cylinder 3, referring to FIGS. 6 and 7, as in Embodiment I, a locking opening 32 may be formed in the mounting cylinder 3, and specifically, the locking opening 32 may be formed along the radial direction 303 of the mounting cylinder 3. The snap-fitting member 42 may include a driving portion 421, a snapping portion 422, and a rotating portion 423 which are integrally connected to each other as a one-piece structure. A mounting cavity 411 may be formed in the docking member 41, the rotating portion 423 may be rotatably mounted in the mounting cavity 411, and a rotating shaft 4231 of the rotating portion 423 may be perpendicular to the axial direction 302 of the mounting cylinder 3. The driving portion 421 may be at least partially exposed from the docking member 41 and also from a side of the second spool body 2 away from the first spool body 1. The snapping portion 422 may swing around the rotating portion 423 to extend in or disengage from the locking opening 32. Driving the driving portion 421 to swing may correspondingly enable the snapping portion 422 to swing, and the snapping portion 422 may undergo a displacement in the radial direction 303 of the mounting cylinder 3. In a case where the snapping portion 422 is arranged in the locking opening 32, when an external force attempts to dislodge the second spool body 2 from the mounting cylinder 3, the snapping portion 422 may abut against an edge of the mounting cylinder 3 for forming the locking opening 32 away from the first spool body 1, thereby preventing the second spool body 2 from further disengaging from the mounting cylinder 3. This limiting assembly 4 also may include an elastic member 43. The clastic member 43 may be located in the mounting cavity 411. One of two ends of the elastic member 43 may be connected to the docking member 41, and the other of two ends of the clastic member 43 may be connected to the driving portion 421 or the snapping portion 422. The elastic member 43 may apply an clastic force to drive the snapping portion 422 to the locking opening 32. For example, as shown in FIG. 6, the elastic member 43 may be a compression spring, and the compression spring may be connected to the driving portion 421 and one side wall of the docking member 41 for forming the mounting cavity 411. As another example, as shown in FIG. 7, the clastic member 43 may be a torsion spring, and the torsion spring may be sleeved on the rotating portion 423 and may be connected to the snapping portion 422 and one side wall of the docking member 41 for forming the mounting cavity 411. In this embodiment, only a linear force along the radial direction 303 of the mounting cylinder 3 needs to be applied to the driving portion 421 to unlock the limiting assembly 4. Then, a linear force along the axial direction 302 of the mounting cylinder 3 may be applied to separate the second spool body 2 from the mounting cylinder 3.

Figure 8:
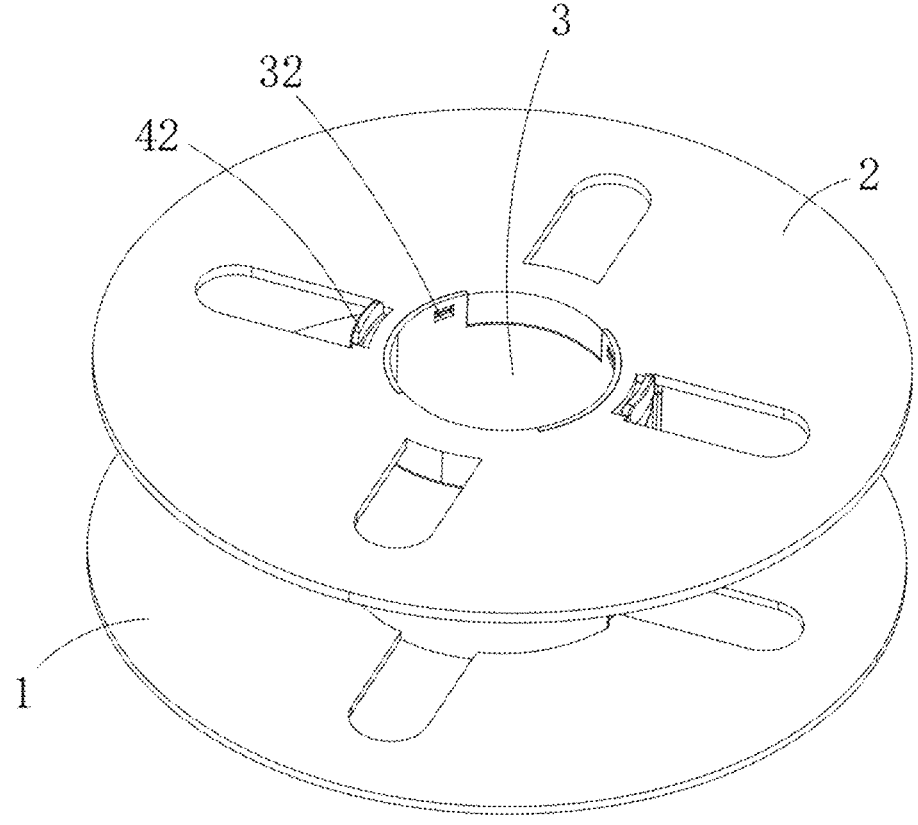
FIG. 8 is a schematic view of the overall structure of the detachable material spool in Embodiment II.
Figure 9:
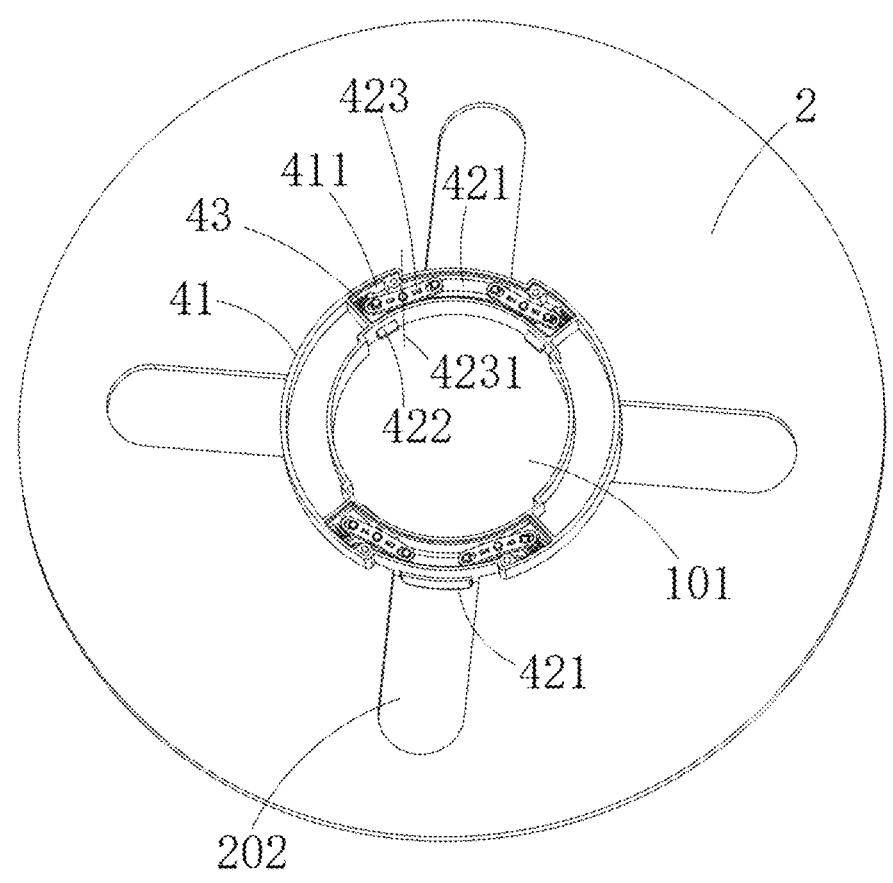
FIG. 9 is a structural view of a second spool body and a limiting assembly of Embodiment II.

Regarding the detachable connection structure of the snap-fitting member 42 and the mounting cylinder 3, referring to FIGS. 8 and 9, as in Embodiment II, a locking opening 32 may be formed in the mounting cylinder 3, and specifically, the locking opening 32 may be formed along the radial direction 303 of the mounting cylinder 3. The snap-fitting member 42 may include a driving portion 421, a snapping portion 422, and a rotating portion 423. A mounting cavity 411 may be formed in the docking member 41.

The rotating portion 423 may be rotatably mounted in the mounting cavity 411. A rotating shaft 4231 of the rotating portion 423 may be parallel to the axial direction 302 of the mounting cylinder 3. The driving portion 421 may be at least partially exposed from the docking member 41, the driving portion 421 may be slidably mounted on the docking member 41, and a sliding direction of the driving portion 421 may be parallel to the radial direction 303 of the mounting cylinder 3. The snapping portion 422 may be also slidably mounted on the docking member 41, and a sliding direction of the snapping portion 422 may also be parallel to the radial direction 303 of the mounting cylinder 3. The rotating portion 423 may be arranged in a shape of a long strip. The driving portion 421 may be movably connected to one of two ends of the rotating portion 423, and the snapping portion 422 may be movably connected to the other of two ends of the rotating portion 423. Specifically, each of the two ends of the rotating portion 423 may define a long hole, and each of the driving portion 421 and the snapping portion 422 may be arranged with a sliding member, and the sliding member of the each of the driving portion 421 and the snapping portion 422 may slide in the long hole of a respective one of the two ends of the rotating portion 423, so that both the driving portion 421 and the snapping portion 422 may slide relative to the rotating portion 423. Driving the driving portion 421 to slide may enable the rotating portion 423 to rotate, thereby driving the snapping portion 422 to slide to enter or disengage from the locking opening 32. In a case where the snapping portion 422 is inserted in the locking opening 32, when an external force attempts to dislodge the second spool body 2 from the mounting cylinder 3, the snapping portion 422 may abut against an edge of the mounting cylinder 3 for forming the locking opening 32 away from the first spool body 1, thereby preventing the second spool body 2 from further disengaging from the mounting cylinder 3. This limiting assembly 4 may also include an elastic member 43. The elastic member 43 may be a compression spring, and the elastic member 43 may be located in the mounting cavity 411. One of two ends of the elastic member 43 may be connected to the docking member 41, and the other of two ends of the elastic member 43 may be connected to the driving portion 421 or the snapping portion 422, and an elastic force of the elastic member 43 may drive the snapping portion 422 to the locking opening 32. In this embodiment, only a linear force along the radial direction 303 of the mounting cylinder 3 needs to be applied to the driving portion 421 to unlock the limiting assembly 4. Then, a linear force along the axial direction 302 of the mounting cylinder 3 may be applied to separate the second spool body 2 from the mounting cylinder 3.

Figure 10:
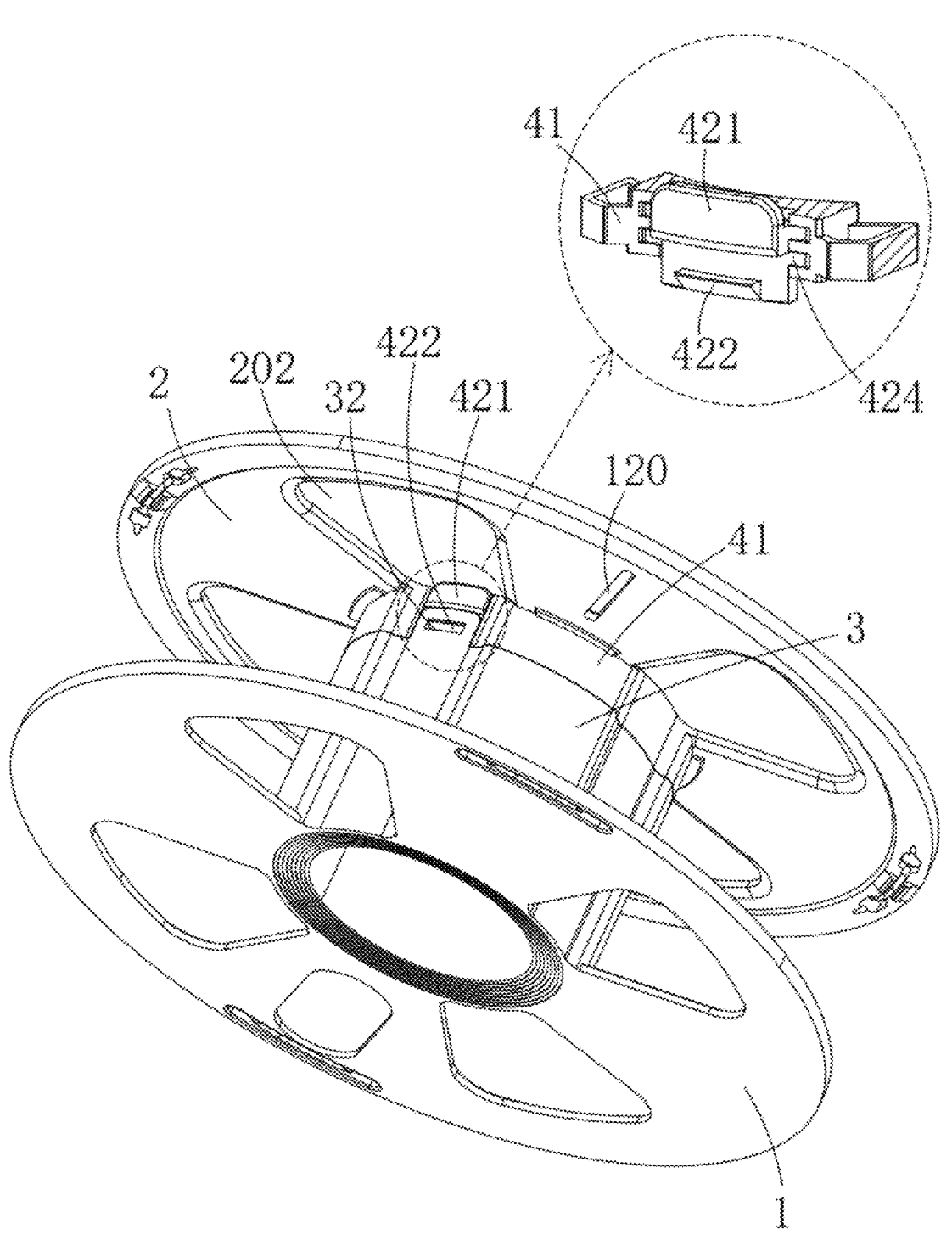
FIG. 10 is a schematic view of the overall structure of the detachable material spool in Embodiment III.
Figure 11:
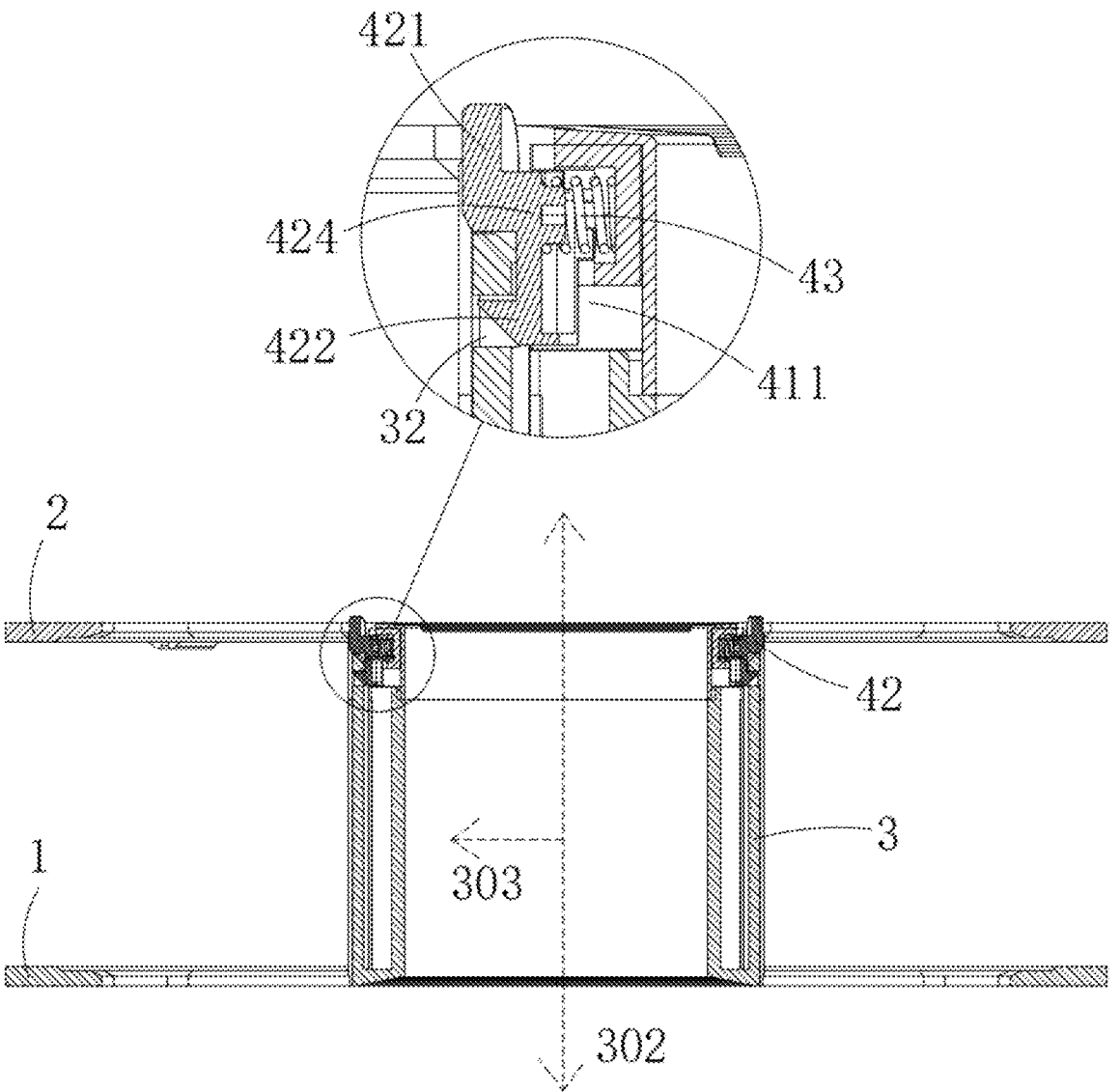
FIG. 11 is a cross-sectional view of the detachable material spool in Embodiment III.

Regarding the detachable connection structure of the snap-fitting member 42 and the mounting cylinder 3, referring to FIGS. 10 and 11, as in Embodiment III, a locking opening 32 may be formed in the mounting cylinder 3, and specifically, the locking opening 32 may be formed along the radial direction 303 of the mounting cylinder 3. The snap-fitting member 42 may include a driving portion 421, a snapping portion 422, and a sliding portion 424 which are integrally connected to each other as a one-piece structure. A mounting cavity 411 may be formed in the docking member 41. The sliding portion 424 may be slidably mounted in the mounting cavity 411, and a sliding direction of the sliding portion 424 may be parallel to the radial direction 303 of the mounting cylinder 3. The driving portion 421 may be at least partially exposed from the docking member 41. By applying an external force to the driving portion 421, the sliding portion 424 may slide along the radial direction 303 of the mounting cylinder 3, thereby driving the snapping portion 422 to enter or disengage from the locking opening 32. In a case where the snapping portion 422 is inserted in the locking opening 32, when an external force attempts to dislodge the second spool body 2 from the mounting cylinder 3, the snapping portion 422 may abut against an edge of the mounting cylinder 3 for forming the locking opening 32 away from the first spool body 1, thereby preventing the second spool body 2 from further disengaging from the mounting cylinder 3. This limiting assembly 4 also may include an elastic member 43. The elastic member 43 may be a compression spring. The elastic member 43 may be located in the mounting cavity 411. One of two ends of the elastic member 43 may be connected to the docking member 41, and the other of the two ends of the elastic member 43 may be connected to one of the driving portion 421, the snapping portion 422, and the sliding portion 424. An elastic force of the elastic member 43 may drive the snapping portion 422 to enter the locking opening 32. In this embodiment, only a linear force along the radial direction 303 of the mounting cylinder 3 needs to be applied to the driving portion 421 to unlock the limiting assembly 4. Then, a linear force along the axial direction 302 of the mounting cylinder 3 may be applied to separate the second spool body 2 from the mounting cylinder 3.

Figure 12:
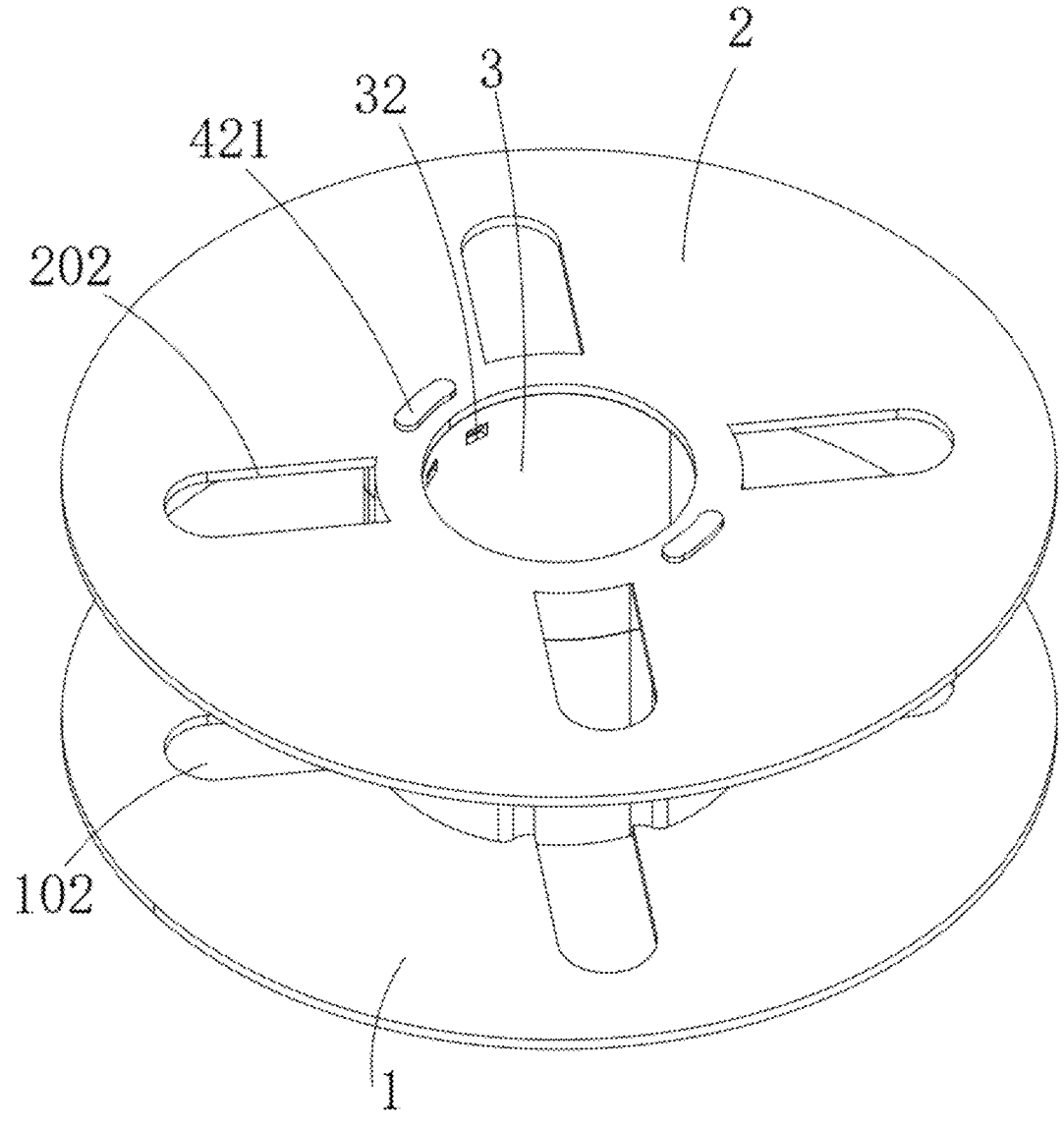
FIG. 12 is a schematic view of the overall structure of the detachable material spool in Embodiment IV.
Figure 13:
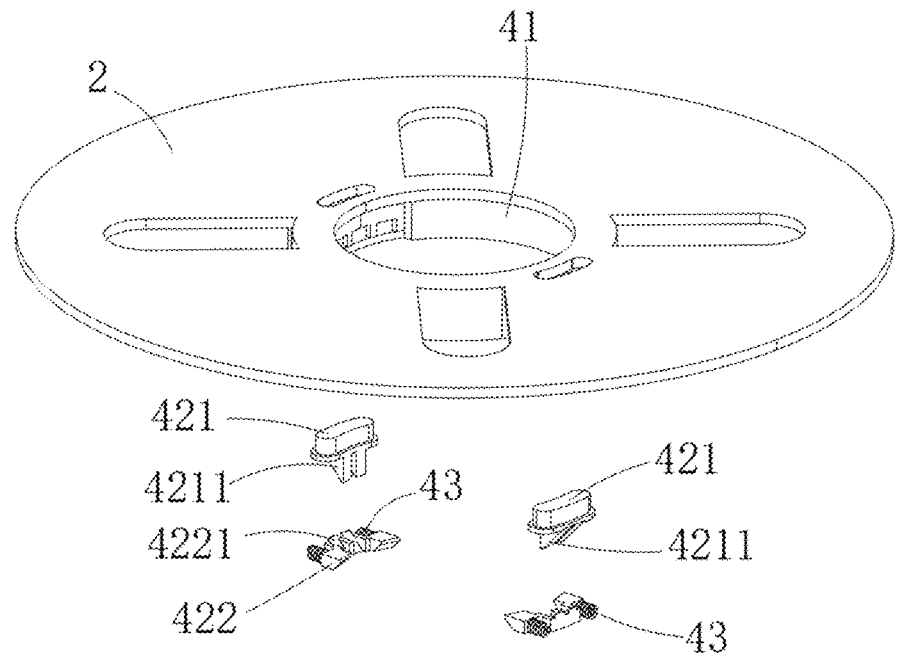
FIG. 13 is a structural view of a second spool body and a limiting assembly of Embodiment IV.

Regarding the detachable connection structure of the snap-fitting member 42 and the mounting cylinder 3, referring to FIGS. 12 and 13, as in Embodiment IV, a locking opening 32 may be formed in the mounting cylinder 3, and specifically, the locking opening 32 may be formed along the radial direction 303 of the mounting cylinder 3. The snap-fitting member 42 may include a driving portion 421 and a snapping portion 422. A mounting cavity 411 may be formed in the docking member 41, and both the driving portion 421 and the snapping portion 422 may be slidably mounted in the mounting cavity 411. A sliding direction of the driving portion 421 may be parallel to the axial direction 302 of the mounting cylinder 3, while a sliding direction of the snapping portion 422 may be parallel to the radial direction 303 of the mounting cylinder 3. The driving portion 421 may be arranged with a first inclined sliding boss 4211 in the mounting cavity 411, the snapping portion 422 may be arranged with a second inclined sliding boss 4221 in the mounting cavity 411, and the first inclined sliding boss 4211 and the second inclined sliding boss 4221 may be slidably connected to each other. The driving portion 421 may be at least partially exposed from the docking member 41 or from a side of the second spool body 2 away from the first spool body 1. By applying an external force to the driving portion 421, the driving portion 421 may slide to the mounting cavity 411. A cooperation of the first inclined sliding boss 4211 and the second inclined sliding boss 4221 may enable the snapping portion 422 to be driven to slide along the radial direction 303 of the mounting cylinder 3, thereby driving the snapping portion 422 to disengage from the locking opening 32. This limiting assembly 4 may further include an elastic member 43. The elastic member 43 may be located in the mounting cavity 411, and one of two ends of the elastic member 43 may be connected to the docking member 41, and the other of two ends of the elastic member 43 may be connected to the snapping portion 422. The elastic member 43 may apply an elastic force to drive the snapping portion 422 to the locking opening 32. In a case where the snapping portion 422 is inserted in the locking opening 32, when an external force attempts to dislodge the second spool body 2 from the mounting cylinder 3, the snapping portion 422 may abut against an edge of the mounting cylinder 3 for forming the locking opening 32 away from the first spool body 1, thereby preventing the second spool body 2 from further disengaging from the mounting cylinder 3. In this embodiment, only a linear force along the axial direction 302 of the mounting cylinder 3 needs to be applied to the driving portion 421 to unlock the limiting assembly 4. Then, a force along the axial direction 302 of the mounting cylinder 3 which is opposite the above linear force along the axial direction 302 of the mounting cylinder 3 may be applied to the second spool body 2 to separate the second spool body 2 from the mounting cylinder 3.

In the above embodiments, the locking opening 32 may be formed on an inner side face of the mounting cylinder 3 or an outer side face of the mounting cylinder 3, and the elastic member 43 may be arranged as a tension spring or a compression spring. This distinction may only change a direction of a movement of the driving portion 421. Furthermore, in order to facilitate mounting of the snap-fitting member 42 and the clastic member 43 to the mounting cavity 411, the docking member 41 may be arranged as several parts and then re-fixed with screws.

Figure 14:
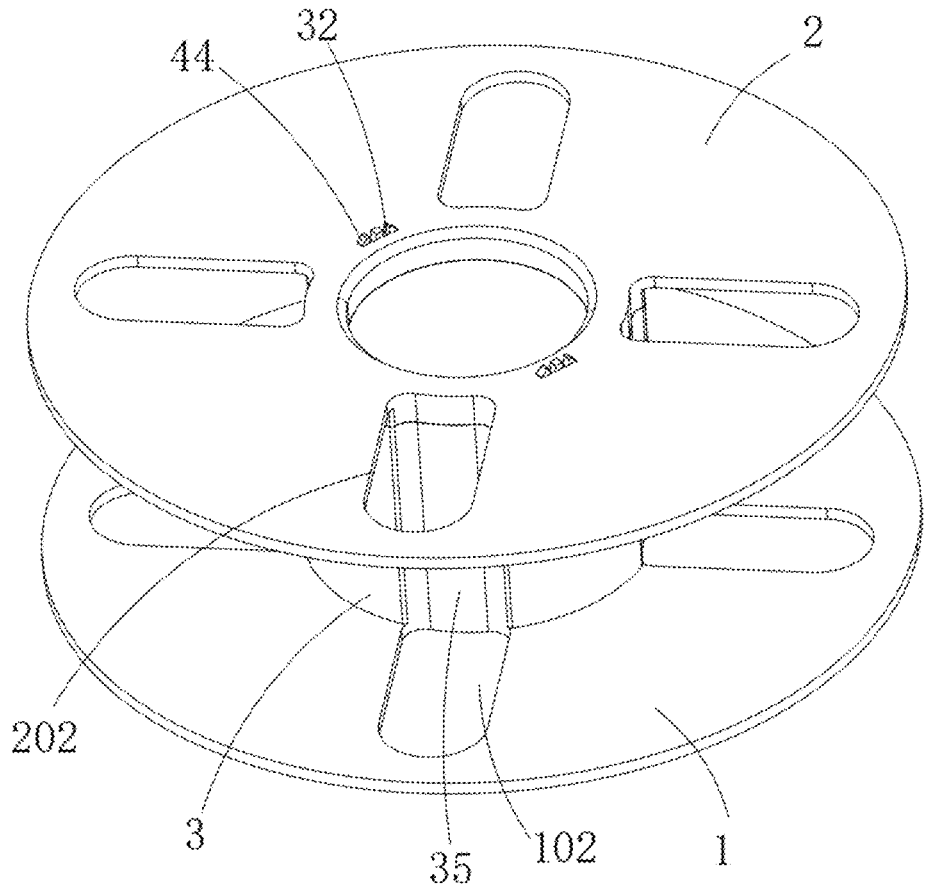
FIG. 14 is a schematic view of the overall structure of the detachable material spool in Embodiment V.
Figure 15:
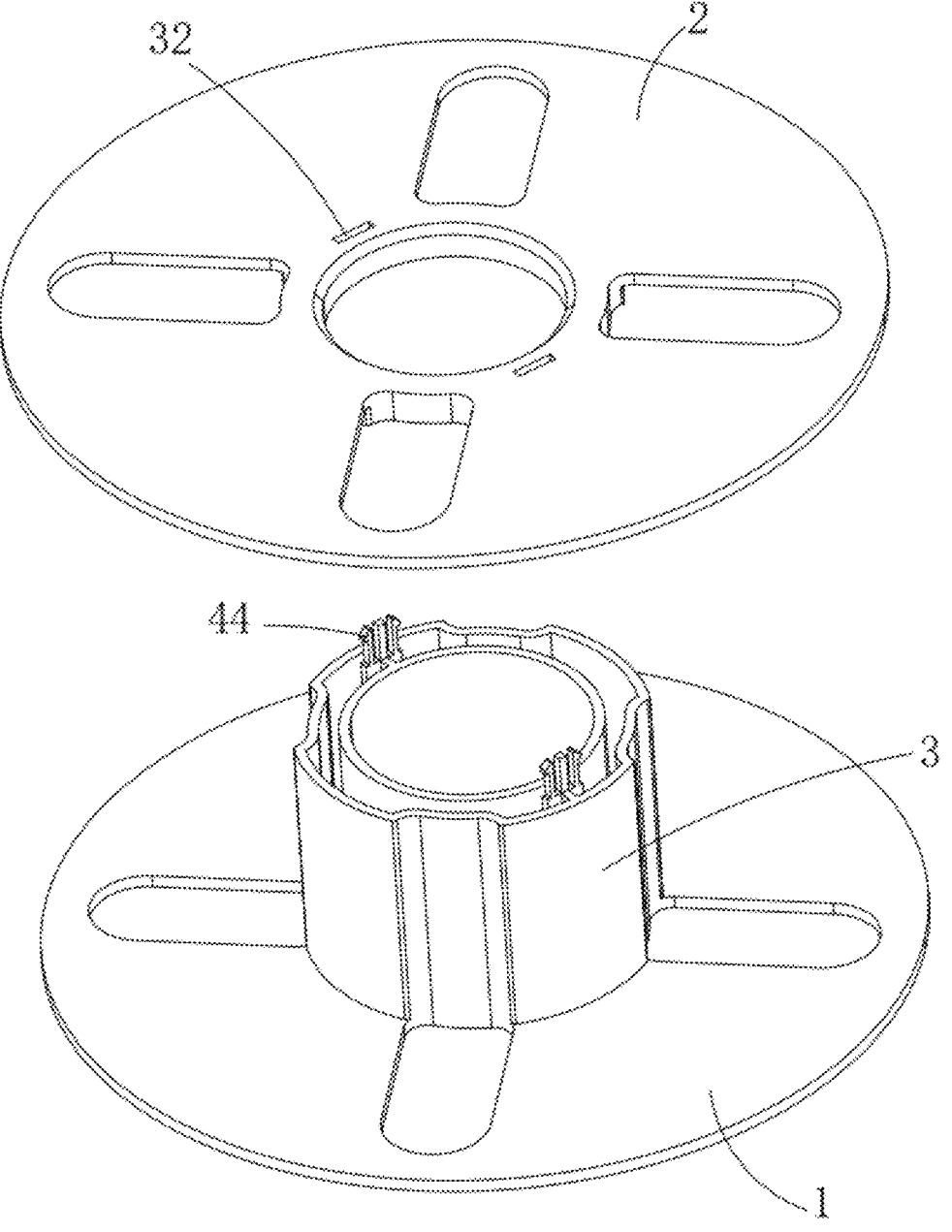
FIG. 15 is an exploded view of the detachable material spool in Embodiment V.
Figure 16:
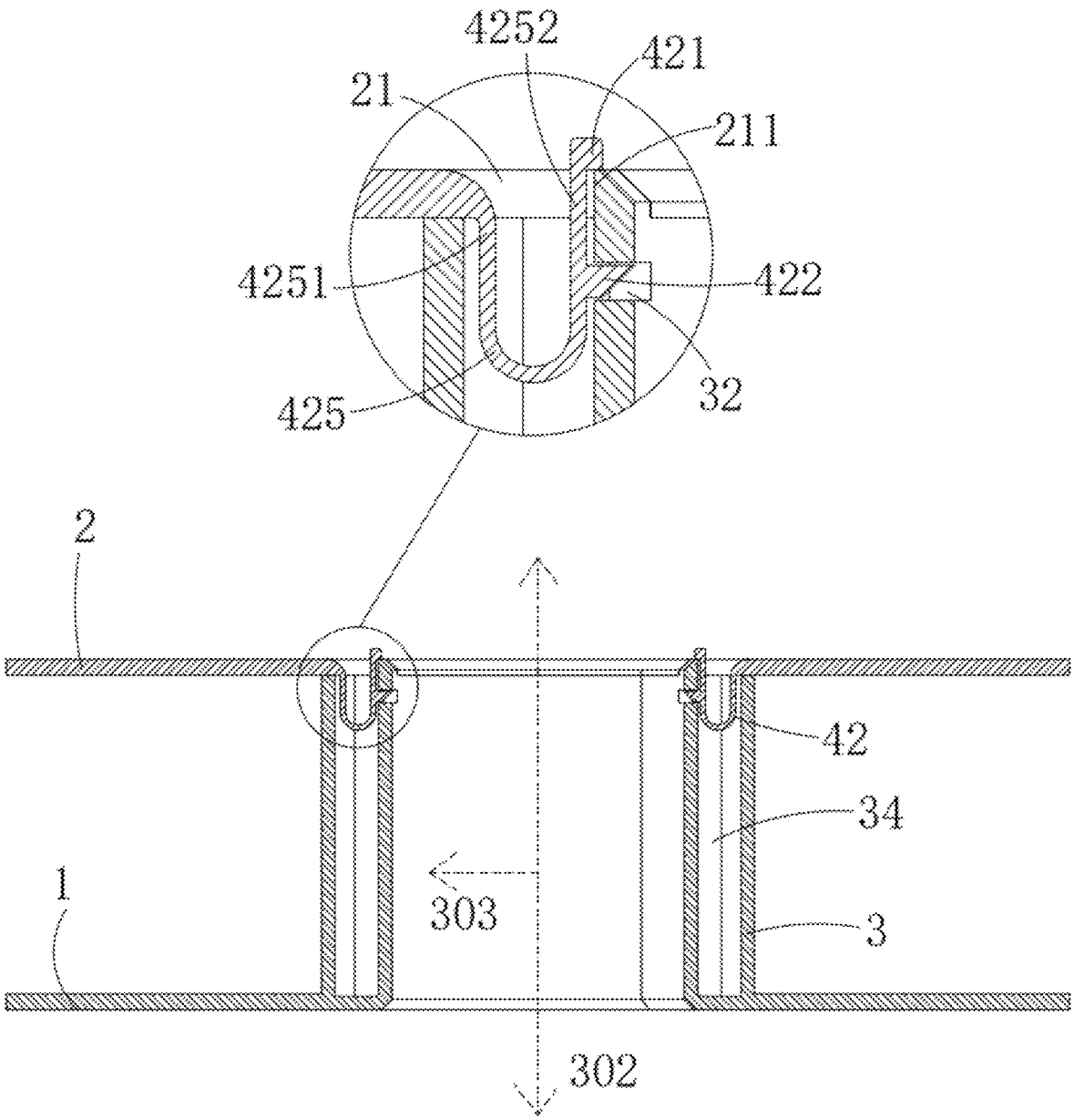
FIG. 16 is a cross-sectional view of the detachable material spool in Embodiment VI.

Regarding a structure of the limiting assembly 4, referring to FIGS. 14 and 16, as in Embodiment V, at least one locking opening 32 may be formed on the second spool body 2. The at least one locking opening 32 may be formed along the axial direction 302 of the mounting cylinder 3. The limiting assembly 4 may include at least two hooks 44, and each two hooks 44 may be arranged corresponding to one locking opening 32. The hooks 44 may be fixedly mounted on the mounting cylinder 3, and the hooks 44 may extend along the axial direction 302 of the mounting cylinder 3. When the second spool body 2 approaches the mounting cylinder 3 along the axial direction 302 of the mounting cylinder 3, the two hooks 44 may pass through the locking opening 32 correspondingly, and the two hooks 44 may be snapped with two opposite sides of the mounting cylinder 3 for forming the corresponding locking opening 32, and when the hooks 44 are snapped in the locking opening 32, the second spool body 2 and the mounting cylinder 3 may be fixed in the circumferential direction 301. When a connection between the snap-fitting member 42 and the second spool body 2 needs to be released, the user may simply bend the two hooks 44 to be disengaged from the locking opening 32. In this embodiment, only linear forces that may be opposite each other and along the radial direction 303 of the mounting cylinder 3 need to be applied to the two hooks 44 to unlock the limiting assembly 4. Then, a linear force along the axial direction 302 of the mounting cylinder 3 may be applied to the second spool body 2 to separate the second spool body 2 from the mounting cylinder 3.

Figure 17:
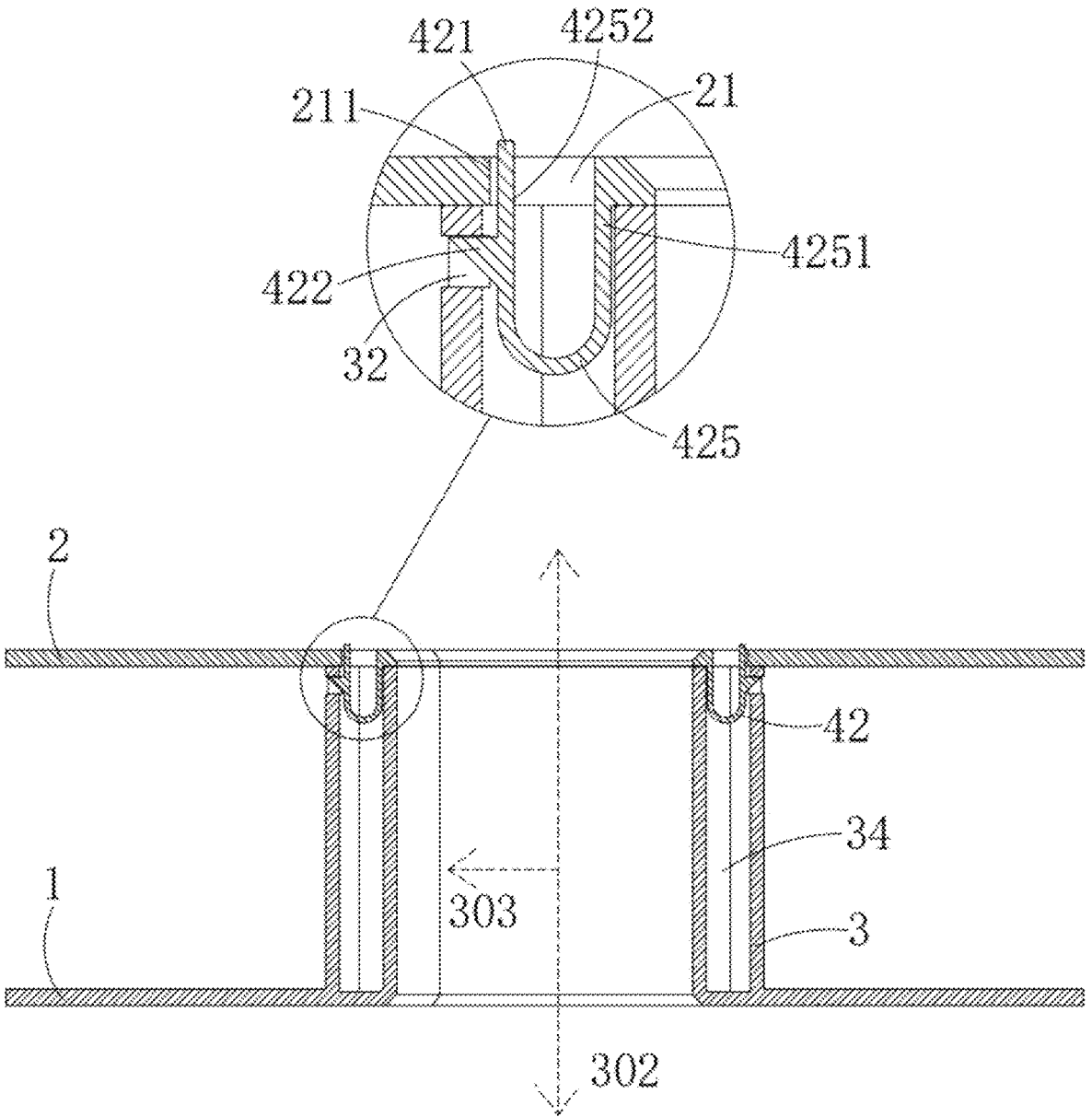
FIG. 17 is another cross-sectional view of the detachable material spool in Embodiment VI.

Regarding the structure of the limiting assembly 4, referring to FIGS. 16 and 17, as in Embodiment VI, the mounting cylinder 3 may define an accommodating slot 34 and a locking opening 32 communicating the accommodating slot 34 with an exterior of the mounting cylinder 3. Specifically, the locking opening 32 may be formed along the radial direction 303 of the mounting cylinder 3. The second spool body 2 may define a mounting opening 21. The limiting assembly 4 may include an elastic connecting portion 425, a driving portion 421, and a snapping portion 422 integrally connected with each other as a one-piece structure. The elastic connecting portion 425 may be arranged in a "U" shape and accommodated in the accommodating slot 34. A first end 4251 of the clastic connecting portion 425 may be connected to the second spool body 2, and a second end 4252 of the clastic connecting portion 425 may be sequentially connected to the snapping portion 422 and the driving portion 421. The driving portion 421 extends out from the mounting opening 21. The second end 4252 of the clastic connecting portion 425 can elastically deform relative to the first end 4251 of the elastic connecting portion 425 in the radial direction 303 of the mounting cylinder 3. An edge of the second spool body 2 for forming the mounting opening 21 away from the first end 4251 of the elastic connecting portion 425 may be an abutting edge 211. An elastic force of the elastic connecting portion 425 may drive the driving portion 421 to abut against the abutting edge 211 and drive the snapping portion 422 to the locking opening 32. When the snapping portion 422 extends in the locking opening 32, the elastic connecting portion 425 may be accommodated in the accommodating slot 34. In example, as shown in FIG. 16, the locking opening 32 may be formed in an inner side face of the mounting cylinder 3. In an example, as shown in FIG. 17, the locking opening 32 may be formed in an outer side face of the mounting cylinder 3. The snap-fitting member 42 may be arranged corresponding to an opening direction of the locking opening 32. In these embodiments, only a linear force along the radial direction 303 of the mounting cylinder 3 needs to be applied to the driving portion 421 to unlock the limiting assembly 4. Then, a linear force along the axial direction 302 of the mounting cylinder 3 may be applied to the second spool body 2 to separate the second spool body 2 from the mounting cylinder 3.

Figure 18:
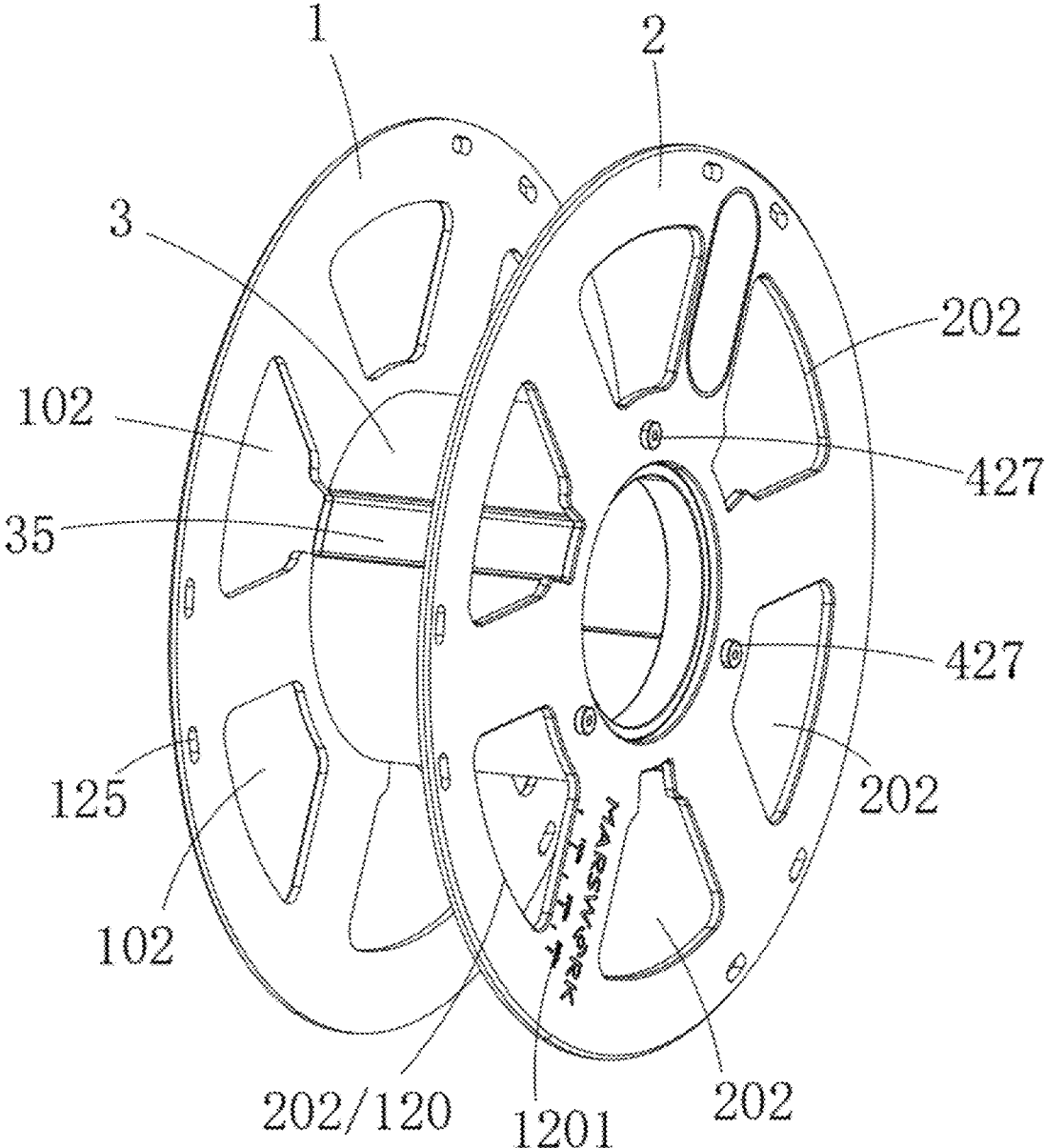
FIG. 18 is a schematic view of the overall structure of the detachable material spool in Embodiment VII.
Figure 19:
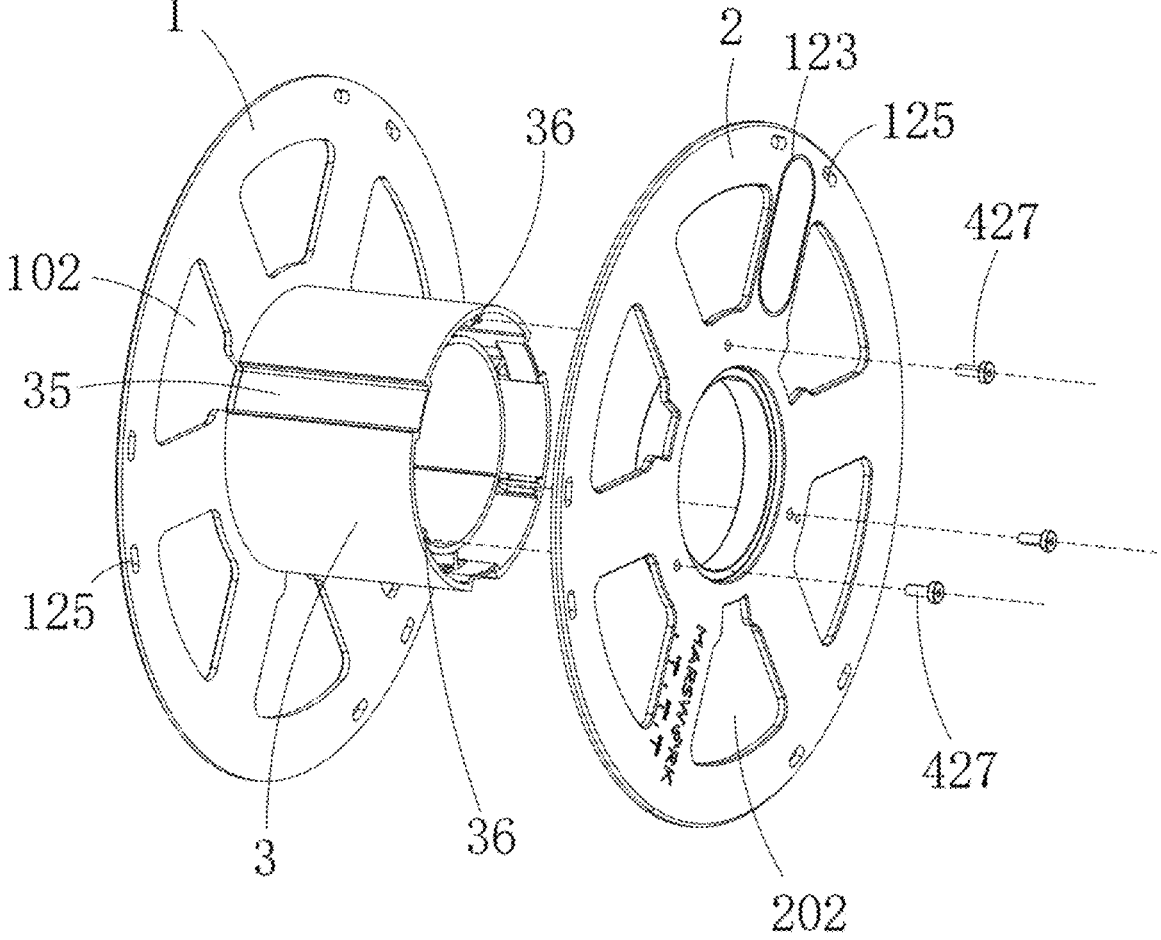
FIG. 19 is an exploded view of the detachable material spool in Embodiment VII.

Regarding the structure of the limiting assembly 4, referring to FIGS. 18 and 19, as in Embodiment VII, the mounting cylinder 3 may define a bolt hole 36 which may be along the axial direction 302. The limiting assembly 4 may include a locking bolt 427, which may pass through the second spool body 2 and may then be screwed and fixed in the bolt hole 36. In this embodiment, after the locking bolt 427 is disengaged from the bolt hole 36, a linear force along the axial direction 302 of the mounting cylinder 3 may be applied to the second spool body 2, thereby separating the second spool body 2 from the mounting cylinder 3.

Figure 3:
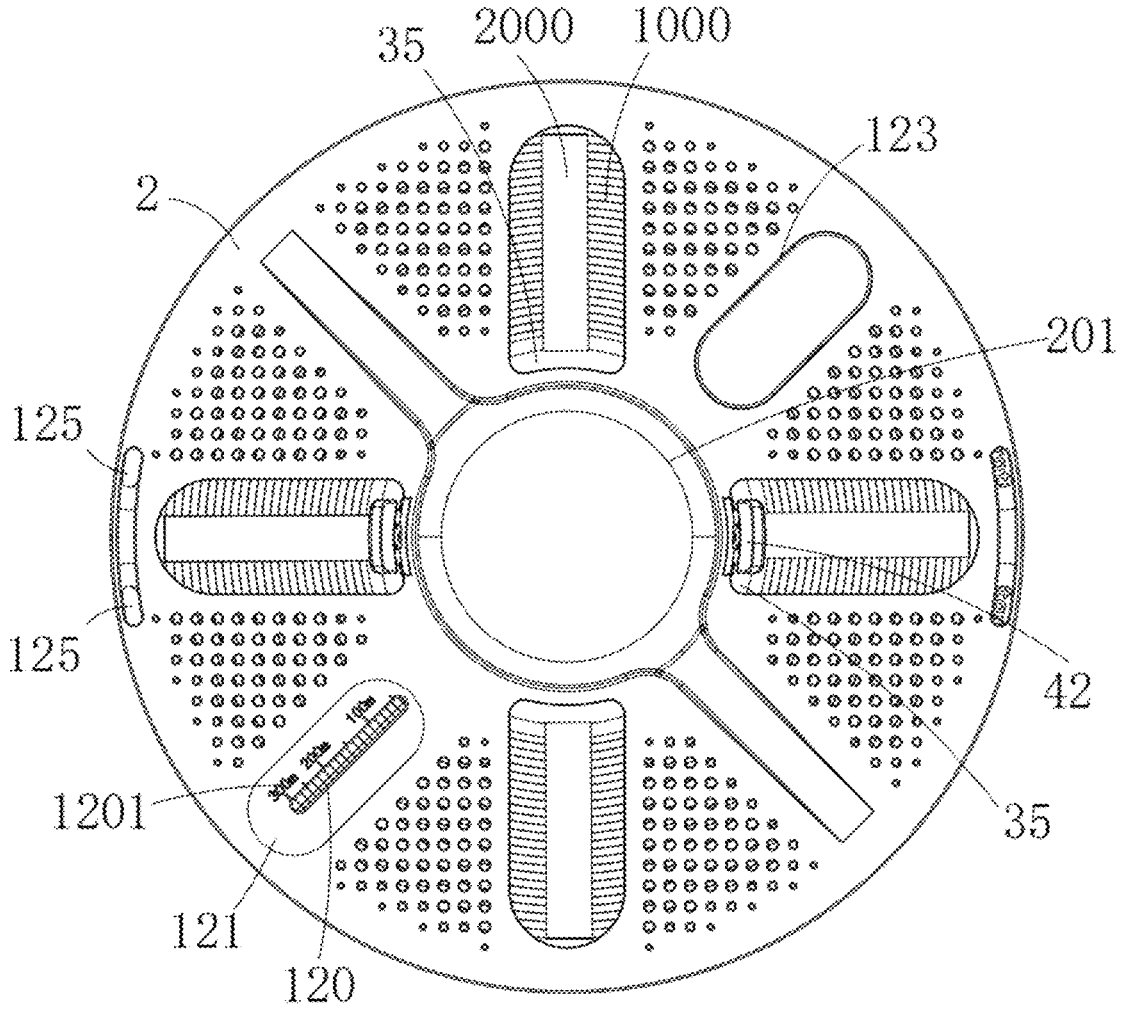
FIG. 3 is a side view of the detachable material spool according to an embodiment of the disclosure.
Figure 4:
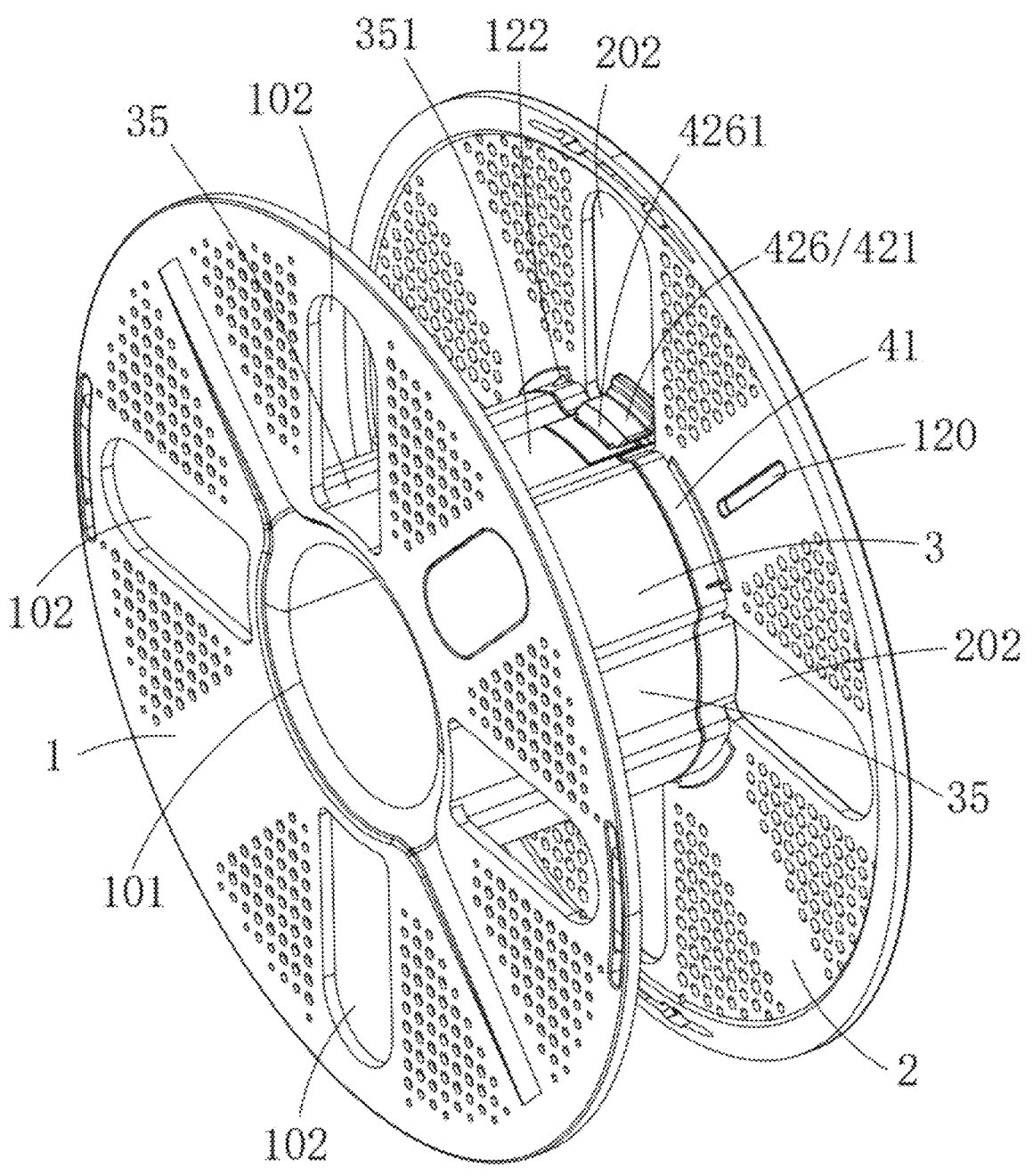
FIG. 4 is another schematic view of the overall structure of the detachable material spool according to an embodiment of the disclosure.

In some embodiments, referring to FIGS. 3 and 4, a through recess 35 may be formed on an outer wall of the mounting cylinder 3 along the axial direction 302. The outer wall of the mounting cylinder 3 may recess to form the through recess 35. The through recess 35 may extend to the snap-fitting member 42. The through recess 35 may communicate the first bundling hole 102 and the second bundling hole 202. The through recess 35 may reserve space for the bundling tool 2000 such as the tape, zip tie, and hook-and-loop fastener to pass through, making it more convenient for the user to bundle the consumable roll 1000.

In some embodiments, the snap-fitting member 42 may be arranged corresponding to the through recess 35, and the snap-fitting member 42 at least partially passes through the second bundling hole 202 to be located on a side of the second spool body 2 away from the first spool body 1. The mounting cylinder 3 may have a bottom face 351 for forming the through recess 35. The bottom face 351 may be spaced apart from the consumable roll 1000. The snap-fitting member 42 may at least partially protrude from the bottom face 351 to form a guiding member 426. The guiding member 426 may be arranged with a guiding face 4261, and the guiding face 4261 may be connected to the bottom face 351 for forming the through recess 35 and may incline outward from the second bundling hole 202. The guiding member 426 may be, for example, the driving portion 421 shown in FIG. 4. The above arrangement of the guiding face 4261 may allow the bundling tool 2000 to pass through the through recess 35 without being blocked by a protruding portion of the snap-fitting member 42, and the guiding face 4261 may guide the bundling tool 2000 out of the second bundling hole 202.

Moreover, to facilitate a quick release of the limiting assembly 4 from the mounting cylinder 3, in some embodiments, four first bundling holes 102 may be formed and distributed along a circumferential direction of the first spool body 1, and four second bundling holes 202 and four through recesses 35 may be correspondingly formed. The limiting assembly 4 may include two snap-fitting members 42 and two elastic members 43. Each snap-fitting member 42 may be arranged as described in the previous Embodiment I. The two snap-fitting members 42 may be arranged centrally symmetrically with respect to the mounting cylinder 3, and each snap-fitting member 42 may be arranged corresponding to one through recess 35. Therefore, the user can press the driving portions 421 of the two snap-fitting members 42 simultaneously with one hand, achieving a purpose of quickly releasing the snap-fitting engagement between the snap-fitting members 42 and the mounting cylinder 3, making it more convenient and easy to use.

Since different types of consumables may have different densities, a weight of consumables of a same volume may also vary. Traditional material spools use weight scales to estimate a remaining amount of the consumable, which has a problem of low accuracy. Therefore, in some embodiments, referring to FIGS. 1 and 2, a transparent window 120 may be formed in at least one of the first spool body 1 and the second spool body 2, through which a remaining thickness of the consumable roll 1000 can be observed, and a length scale mark 1201 may be arranged close to the transparent window 120. In this embodiment, the length scale mark 1201 may express the remaining amount of the consumable, which may provide a more accurate assessment. Alternatively, any of the first bundling holes 102/ second bundling holes 202 may also be used as the transparent window 120, as shown in FIG. 18.

Figure 2:
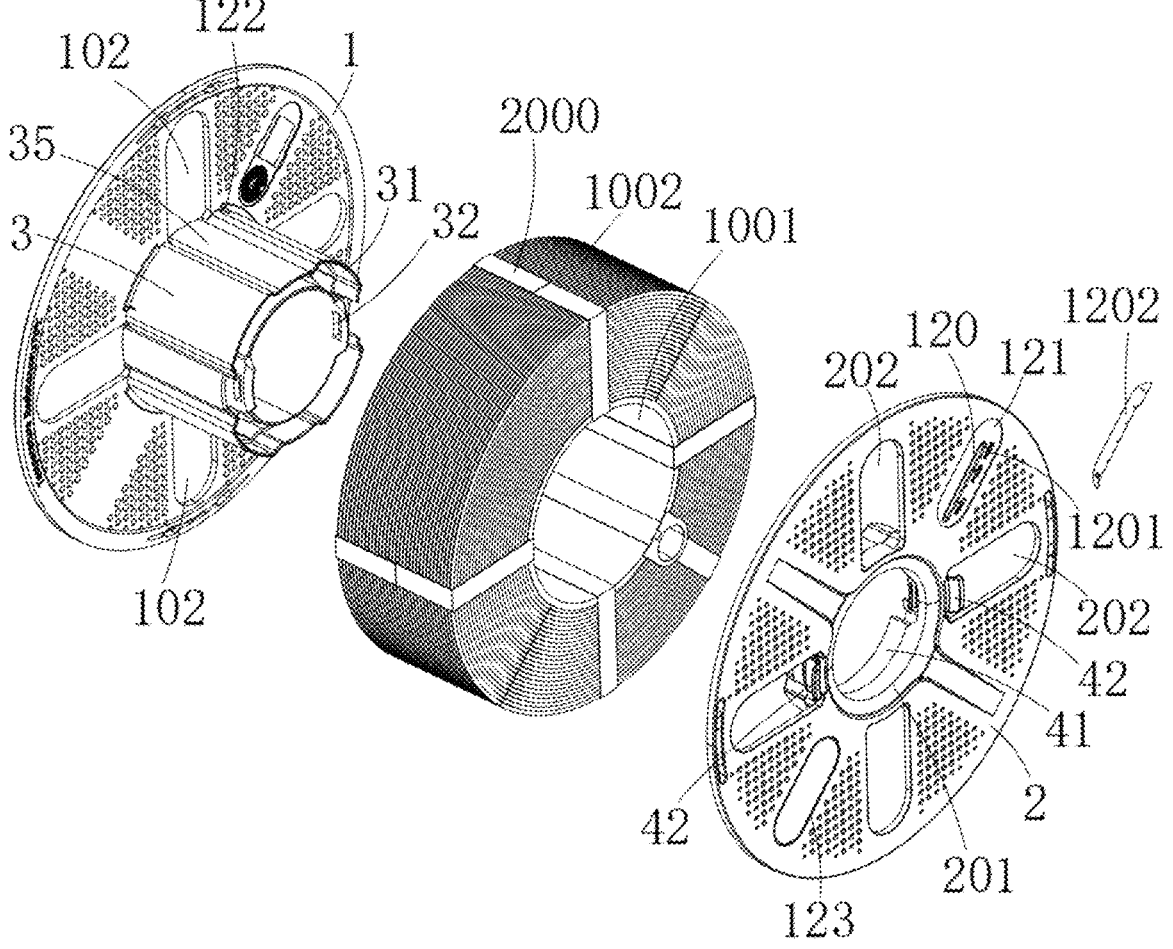
FIG. 2 is an exploded view of the detachable material spool according to an embodiment of the disclosure.

Of course, ac method of assessing the remaining consumable amount by weight can also be retained. Therefore, in some embodiments, a scale groove 121 may be formed in at least one of the first spool body 1 and the second spool body 2, and both the transparent window 120 and the length scale mark 1201 may be arranged in the scale groove 121. As shown in FIG. 2, the detachable material spool may further include a weight scale sticker 1202, which may be affixed in the scale groove 121. The weight scale sticker 1202 may be optional. When the weight scale sticker 1202 is needed, the user can affix the weight scale sticker 1202 next to the transparent window 120 in the scale groove 121.

Figure 5:
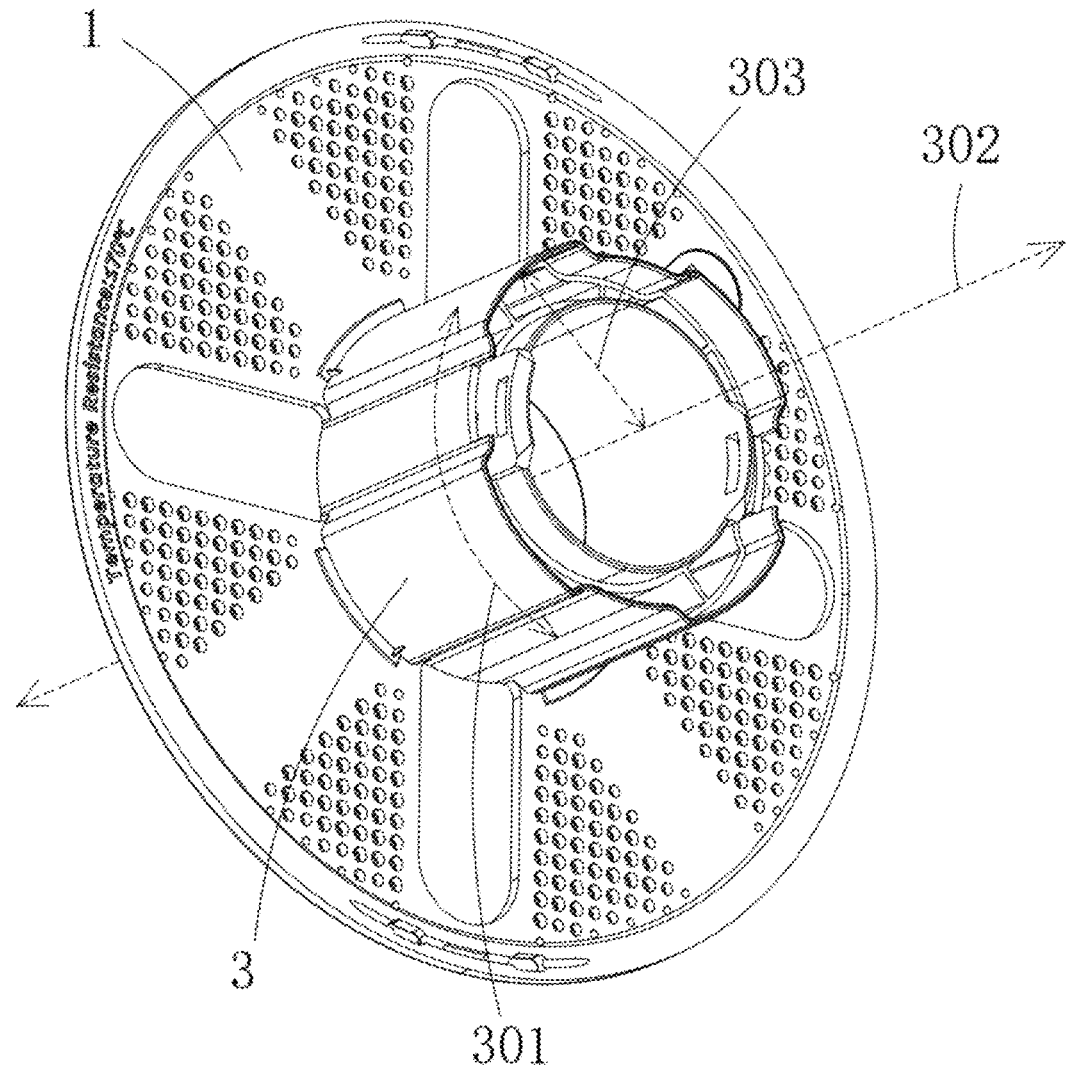
FIG. 5 is a structural view of a first spool body and a mounting cylinder according to an embodiment of the disclosure.

In some embodiments, referring to FIGS. 2, 4, and 5, at least one of the first spool body 1 and the second spool body 2 may be arranged with a rib 122. The rib 122 may extend towards the mounting cylinder 3, and the rib 122 may abut against the consumable roll 1000. The rib 122 may be roughly triangular. An end of the rib 122 extending towards the mounting cylinder 3 may extend to the inner cylinder 1001 of the consumable roll 1000. Furthermore, each of the first spool body 1 and the second spool body 2 may be arranged with a plurality of ribs 122 around the mounting cylinder 3.

When the consumable roll 1000 is sleeved on the mounting cylinder 3 and the second spool body 2 is connected to the mounting cylinder 3, the second spool body 2 may force the inner cylinder 1001 of the consumable roll 1000 to abut against the ribs 122, causing the inner cylinder 1001 to deform, thereby clamping the consumable roll 1000 and preventing the consumable roll 1000 from rotating in the circumferential direction 301 of the mounting cylinder 3. That is, when the second spool body 2 is mounted on the mounting cylinder 3 and the limiting assembly 4 is connected to the mounting cylinder 3, a positional relationship among the first spool body 1, the second spool body 2, the mounting cylinder 3, and the consumable cylinder may be locked. With this arrangement, when the user mounts the consumable roll 1000, there may be no need to specifically observe and calibrate a position of the consumable roll 1000, simplifying a mounting operation.

In some embodiments, at least one of the first spool body 1 and the second spool body 2 may define a color card mounting slot 123. A color card may be mounted in the color card mounting slot 123. A color of the color card may correspond to a color of a material printed with the consumable, and the color card may facilitate the user in distinguishing a color of the consumable in the material spool. The user may print out a color card of a corresponding color using the consumable and mount the color card in the color card mounting slot 123. A snap-fitting structure may be arranged in the color card mounting slot 123 to be snapped with the color card. In addition, the color card can be arranged with an RFID chip for recording corresponding information.

For the consumable roll 1000 that have not been fully consumed, to facilitate fixing the consumable filament 1002, in some embodiments, at least one of the first spool body 1 and the second spool body 2 may define a wire clamping hole 125 which may be a through hole, which may be used for the consumable filament 1002 to pass through. For example, as shown in FIG. 1, two wire clamping holes 125 may be formed in the first spool body 1, and the consumable filament 1002 may sequentially pass through the two wire clamping holes 125 to lock a position of the consumable filament 1002.

To prevent damage to the consumable filament 1002 during clamping, in some other embodiments, at least one of the first spool body 1 and the second spool body 2 may define a wire clamping groove 124. The wire clamping groove 124 may be formed on a side of the first spool body 1 facing the second spool body 2 or on a side of the second spool body 2 facing the first spool body 1. The wire clamping groove 124 may extend along the circumferential direction 301 of the mounting cylinder 3. A width of the wire clamping groove 124 may be slightly smaller than a diameter of the consumable filament 1002, so that the consumable filament 1002 may be clamped in the wire clamping groove 124 by means of an interference fit, and a position of the consumable filament 1002 may be locked at an outlet of the consumable roll 1000. It should be noted that the consumable filament 1002 clamped in the wire clamping groove 124 is not shown in the drawings.

In other embodiments, both the wire clamping hole 125 and the wire clamping groove 124 may be formed, and the wire clamping hole 125 may be communicated with the wire clamping groove 124, so the user can choose to use either one of the wire clamping hole 125 and the wire clamping groove 124.

Various embodiments of the disclosure may have one or more of the following effects. In some embodiments, rotation of a component is not required during the disassembly and separation of the second spool body 2. After releasing a connection between the limiting assembly 4 and the mounting cylinder 3, the second spool body 2 may move directly along the axial direction 302 of the mounting cylinder 3 to be detached from the mounting cylinder 3, and the consumable roll 1000 on the detached material spool may be replaced, achieving reusability of the material spool.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A detachable material spool, comprising:
   a first spool body and a second spool body, wherein, the first spool body defines at least one first bundling hole, and the second spool body defines at least one second bundling hole;
   a mounting cylinder, arranged on the first spool body and configured to mount a consumable roll, wherein at least one bundling tool is arranged to bundle the consumable roll; and
   a limiting assembly, arranged on the second spool body, wherein the second spool body is detachably connected to the mounting cylinder through the limiting assembly;
   wherein during disassembly of the second spool body from the mounting cylinder, the second spool body moves only along an axial direction of the mounting cylinder, or the second spool body moves only along an oblique path which forms a fixed angle with respect to the axial direction of the mounting cylinder, for enabling the second spool body to be detached from an end face of the consumable roll;
   at least a part of an outer wall of the mounting cylinder is recessed inwardly towards a center axis of the mounting cylinder to form at least one through recess; each of the at least one through recess extends from a respective one of the at least one first bundling hole to a respective one of the at least one second bundling hole; each of the at least one bundling tool is received in a respective one of the at least one through recess.

2. The detachable material spool according to claim 1, wherein the limiting assembly comprises a docking member and a snap-fitting member mounted on the docking member, the docking member is annularly arranged on a side of the second spool body facing the first spool body, the docking member is coaxially connected to the mounting cylinder, and the snap-fitting member is snapped with the mounting cylinder.

3. The detachable material spool according to claim 2, wherein the mounting cylinder defines an insertion slot extending along the axial direction of the mounting cylinder, the docking member is at least partially inserted in the insertion slot, and when the docking member is inserted in the insertion slot, the docking member and the mounting cylinder are fixed in a circumferential direction of the mounting cylinder.

4. The detachable material spool according to claim 2, wherein the docking member defines an insertion slot extending along the axial direction of the mounting cylinder, the mounting cylinder is at least partially inserted in the insertion slot, and when the mounting cylinder is inserted in the insertion slot, the docking member and the mounting cylinder are fixed in a circumferential direction of the mounting cylinder.

5. The detachable material spool according to claim 2, wherein the mounting cylinder defines a locking opening, the locking opening is formed along a radial direction of the mounting cylinder;
   the snap-fitting member comprises a driving portion and a snapping portion drivingly connected to the driving portion, each of the driving portion and the snapping portion is movably arranged on the docking member, the driving portion is at least partially exposed from the docking member, and driving the driving portion to move enables the snapping portion to move along the radial direction of the mounting cylinder and to enter or disengage from the locking opening.

6. The detachable material spool according to claim 5, wherein each of the driving portion and the snapping portion is slidably mounted on the docking member, and each of the driving portion and the snapping portion is configured to slide along the radial direction of the mounting cylinder;
   the snap-fitting member further comprises a rotating portion arranged in a shape of a long strip, the rotating portion is rotatably arranged on the docking member, the rotating portion comprises a rotating shaft, and the rotating shaft is parallel to the axial direction of the mounting cylinder, each of the driving portion and the snapping portion is movably connected to the rotating portion, and driving the driving portion to slide enables the snapping portion to slide;
   the limiting assembly further comprises an elastic member, one of two ends of the elastic member is connected to the docking member, the other of two ends of the elastic member is connected to one of the driving portion or the snapping portion, and the elastic member is configured to drive the snapping portion to enter the locking opening via an elastic force of the elastic member.

7. The detachable material spool according to claim 5, wherein the snap-fitting member further comprises a sliding portion, the driving portion, the snapping portion, and the sliding portion are integrally connected to each other as a one-piece structure, the sliding portion is slidably mounted on the docking member, the sliding portion is configured to slide along the radial direction of the mounting cylinder, and each of the driving portion and the snapping portion is configured to slide synchronously with the sliding portion;
   the limiting assembly further comprises an elastic member, one of two ends of the elastic member is connected to the docking member, the other of the two ends of the elastic member is connected to one of the driving portion, the snapping portion, and the sliding portion, and the elastic member is configured to drive the snapping portion to enter the locking opening via an elastic force of the elastic member.

8. The detachable material spool according to claim 5, wherein each of the driving portion and the snapping portion is slidably connected to the docking member, the driving portion is configured to slide along the axial direction of the mounting cylinder, and the snapping portion is configured to slide along the radial direction of the mounting cylinder, the driving portion is arranged with a first inclined sliding boss, the snapping portion is arranged with a second inclined sliding boss corresponding to the first inclined sliding boss, the first inclined sliding boss and the second inclined sliding boss are slidably connected to each other, and driving the driving portion to slide enables the snapping portion to disengage from the locking opening;

the limiting assembly further comprises an elastic member, one of two ends of the elastic member is connected to the docking member, the other of the two ends of the elastic member is connected to the snapping portion, and the elastic member is configured to drive the snapping portion to enter the locking opening via an elastic force of the elastic member.

9. The detachable material spool according to claim 1, wherein the second spool body defines a locking opening, the locking opening is formed along the axial direction of the mounting cylinder;

the limiting assembly comprises a hook, the hook is fixedly mounted on the mounting cylinder, the hook extends along the axial direction of the mounting cylinder, and the hook is elastically snapped in the locking opening.

10. The detachable material spool according to claim 1, wherein the mounting cylinder defines an accommodating slot and a locking opening, the accommodating slot and an exterior of the mounting cylinder are communicated with each other through the locking opening, and the locking opening is formed along a radial direction of the mounting cylinder;

the limiting assembly comprises an elastic connecting portion, a driving portion, and a snapping portion which are integrally connected to each other as a one-piece structure, and the elastic connecting portion is arranged in a U shape and accommodated in the accommodating slot; the elastic connecting portion comprises a first end and a second end, the first end of the elastic connecting portion is connected to the second spool body, the second end of the elastic connecting portion is connected to the snapping portion and the driving portion, and the second end of the elastic connecting portion is capable of elastically deforming relative to the first end of the elastic connecting portion;

the second spool body defines a mounting opening, the driving portion is at least partially exposed from the mounting opening, an edge of the second spool body for forming the mounting opening away from the first end of the elastic connecting portion is an abutting edge, and the elastic connecting portion is configured to drive the driving portion to abut against the abutting edge and to drive the snapping portion to enter the locking opening via an elastic force of the elastic connecting portion.

11. The detachable material spool according to claim 1, wherein the first spool body defines at least one first bundling hole, and the second spool body defines at least one second bundling hole, a position of the at least one first bundling hole and a position of the at least one second bundling hole correspond to each other, and each of the at least one first bundling hole and the at least one second bundling hole is configured for a bundling tool to pass through.

12. The detachable material spool according to claim 11, wherein the mounting cylinder defines at least one through recess extending along the axial direction, the at least one through recess is formed to open towards the consumable roll, and the at least one first bundling hole and the at least one second bundling hole are communicated with each other through the at least one through recess.

13. The detachable material spool according to claim 12, wherein the limiting assembly comprises at least one snap-fitting member, the at least one snap-fitting member is movably mounted on the second spool body, and the at least one snap-fitting member is configured to be snapped with the mounting cylinder;

the at least one snap-fitting member is arranged corresponding to the at least one through recess, and the at least one snap-fitting member at least partially passes through the at least one second bundling hole to be located on a side of the second spool body away from the first spool body; the mounting cylinder has a bottom face for forming the at least one through recess, the bottom face is spaced from the consumable roll, and the at least one snap-fitting member partially protrudes from the bottom face to form a guiding member, the guiding member is arranged with a guiding face, and the guiding face is connected to the bottom face of the at least one through recess.

14. The detachable material spool according to claim 13, wherein the number of the at least one first bundling hole is at least two, the number of the at least one second bundling hole is at least two, and the number of the at least one through recess is at least two, and the at least two first bundling holes are distributed in a circumferential direction of the first spool body;

the number of the at least one snap-fitting member is two, the two snap-fitting members are arranged centrally symmetrically with respect to the mounting cylinder, and each of the two snap-fitting members is arranged positionally corresponding to a respective one of two of the at least two through recesses.

15. The detachable material spool according to claim 1, wherein at least one of the first spool body and the second spool body is arranged with a transparent window; the detachable material spool further comprises a length scale mark, and the length scale mark is arranged close to the transparent window.

16. The detachable material spool according to claim 15, wherein at least one of the first spool body and the second spool body defines a scale groove, and the transparent window is arranged in the scale groove;

the detachable material spool further comprises a weight scale sticker, and the weight scale sticker is affixed in the scale groove.

17. The detachable material spool according to claim 1, wherein at least one of the first spool body and the second spool body is arranged with a rib, the rib extends towards the mounting cylinder to be further arranged on another part of the outer wall of the mounting cylinder, the another part of the outer wall of the mounting cylinder protrudes with respect to the at least one through recess in a radial direction of the mounting cylinder, and the rib is configured to abut against the consumable roll and is disposed between an inner cylinder wall of the consumable roll and the outer wall of the mounting cylinder.

18. The detachable material spool according to claim 1, wherein at least one of the first spool body and the second spool body defines a mounting slot in which a color card is mounted.

19. The detachable material spool according to claim 1, wherein at least one of the first spool body and the second spool body defines a wire clamping groove, the wire clamping groove is formed on a side of the first spool body facing the second spool body or on a side of the second spool body facing the first spool body, and the wire clamping groove extends along a circumferential direction of the mounting cylinder;

at least one of the first spool body and the second spool body defines a wire clamping hole, the wire clamping hole is a through hole, and the wire clamping hole is communicated with the wire clamping groove.

20. A detachable material spool, comprising:

a first spool body and a second spool body;

a mounting cylinder, arranged on the first spool body and configured to mount a consumable roll; and a limiting assembly, arranged on the second spool body, wherein the second spool body is detachably connected to the mounting cylinder through the limiting assembly;

wherein:

during disassembly of the second spool body from the mounting cylinder, the second spool body moves only along an axial direction of the mounting cylinder, or the second spool body moves only along an oblique path which forms a fixed angle with respect to the axial direction of the mounting cylinder, for enabling the second spool body to be detached from an end face of the consumable roll;

wherein the limiting assembly comprises a docking member and a snap-fitting member mounted on the docking member, the docking member is annularly arranged on a side of the second spool body facing the first spool body, the docking member is coaxially connected to the mounting cylinder, and the snap-fitting member is snapped with the mounting cylinder;

the mounting cylinder defines a locking opening, the locking opening is formed along a radial direction of the mounting cylinder;

the snap-fitting member comprises a driving portion and a snapping portion drivingly connected to the driving portion, each of the driving portion and the snapping portion is movably arranged on the docking member, the driving portion is at least partially exposed from the docking member, and driving the driving portion to move enables the snapping portion to move along the radial direction of the mounting cylinder and to enter or disengage from the locking opening;

wherein the snap-fitting member further comprises a rotating portion, the driving portion, the snapping portion, and the rotating portion are integrally connected to each other as a one-piece structure; the rotating portion is rotatably arranged on the docking member, the rotating portion comprises a rotating shaft, and the rotating shaft is perpendicular to the axial direction of the mounting cylinder; each of the driving portion and the snapping portion is capable of swinging about the rotating portion, and driving the driving portion to swing around the rotating portion enables the snapping portion to swing;

the limiting assembly further comprises an elastic member, one of two ends of the elastic member is connected to the docking member, the other of the two ends of the elastic member is connected to one of the driving portion and the snapping portion, and the elastic member is configured to drive the snapping portion to enter the locking opening via an elastic force of the elastic member.

* * * * *